United States Patent
Sengoku et al.

(10) Patent No.: US 10,353,837 B2
(45) Date of Patent: Jul. 16, 2019

(54) METHOD AND APPARATUS TO ENABLE MULTIPLE MASTERS TO OPERATE IN A SINGLE MASTER BUS ARCHITECTURE

(71) Applicant: QUALCOMM Incorporated, San Diego, CA (US)

(72) Inventors: Shoichiro Sengoku, San Diego, CA (US); Richard Dominic Wietfeldt, San Diego, CA (US); George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 15/087,535

(22) Filed: Mar. 31, 2016

(65) Prior Publication Data

US 2016/0217090 A1    Jul. 28, 2016

Related U.S. Application Data

(63) Continuation-in-part of application No. 14/595,030, filed on Jan. 12, 2015, now Pat. No. 9,690,725, and a
(Continued)

(51) Int. Cl.
*G06F 13/364* (2006.01)
*G06F 13/42* (2006.01)
(Continued)

(52) U.S. Cl.
CPC ........ *G06F 13/364* (2013.01); *G06F 11/3027* (2013.01); *G06F 13/24* (2013.01);
(Continued)

(58) Field of Classification Search
None
See application file for complete search history.

(56) References Cited

U.S. PATENT DOCUMENTS

| 3,629,823 A | 12/1971 | Czernikowski |
| 4,398,265 A | 8/1983 | Puhl et al. |

(Continued)

FOREIGN PATENT DOCUMENTS

| CN | 1082288 A | 2/1994 |
| CN | 1084986 A | 4/1994 |

(Continued)

OTHER PUBLICATIONS

International Search Report and Written Opinion—PCT/US2017/020816—ISA/EPO—dated May 17, 2017.
(Continued)

*Primary Examiner* — Idriss N Alrobaye
*Assistant Examiner* — Dayton Lewis-Taylor
(74) *Attorney, Agent, or Firm* — Loza & Loza LLP

(57) ABSTRACT

To accommodate multiple masters over bus architectures supporting a single master device, a mechanism is provided for an inactive master device to assert an in-band IRQ. A current master then polls the other inactive master devices over a shared data bus to ascertain which inactive master device is asserting the IRQ. Upon identifying the asserting inactive master device, the current master device grants control of the data bus to the new master device, thereby making the inactive master the new active master device.

30 Claims, 28 Drawing Sheets

Related U.S. Application Data continuation-in-part of application No. 14/480,540, filed on Sep. 8, 2014, now Pat. No. 9,519,603.

(60) Provisional application No. 61/927,102, filed on Jan. 14, 2014, provisional application No. 61/875,547, filed on Sep. 9, 2013.

(51) Int. Cl.

| | |
|---|---|
| *G06F 13/26* | (2006.01) |
| *G06F 13/24* | (2006.01) |
| *G06F 13/36* | (2006.01) |
| *G06F 13/362* | (2006.01) |
| *G06F 11/30* | (2006.01) |

(52) U.S. Cl.
CPC .............. *G06F 13/26* (2013.01); *G06F 13/36* (2013.01); *G06F 13/362* (2013.01); *G06F 13/426* (2013.01); *G06F 13/4256* (2013.01); *G06F 2213/3602* (2013.01)

(56) References Cited

U.S. PATENT DOCUMENTS

| | | | |
|---|---|---|---|
| 4,546,351 | A | 10/1985 | Nambu |
| 4,697,265 | A | 9/1987 | Nozue |
| 4,800,564 | A | 1/1989 | DeFazio et al. |
| 5,257,270 | A | 10/1993 | Hilden et al. |
| 5,274,647 | A | 12/1993 | Tanaka |
| 5,321,818 | A | 6/1994 | Wendling et al. |
| 5,581,770 | A | 12/1996 | Suzuki |
| 5,613,128 | A | 3/1997 | Nizar et al. |
| 5,687,356 | A | 11/1997 | Basso et al. |
| 5,787,263 | A | 7/1998 | Tamagawa et al. |
| 5,818,362 | A | 10/1998 | Walker |
| 5,872,519 | A | 2/1999 | Issa et al. |
| 6,147,963 | A | 11/2000 | Walker et al. |
| 6,191,632 | B1 | 2/2001 | Iwata et al. |
| 6,195,764 | B1 | 2/2001 | Caldara et al. |
| 6,253,268 | B1 | 6/2001 | Bjoerkengren et al. |
| 6,359,951 | B1 | 3/2002 | Morriss et al. |
| 6,370,668 | B1 | 4/2002 | Garrett, Jr. et al. |
| 6,532,506 | B1 | 3/2003 | Dunstan et al. |
| 6,609,167 | B1 | 8/2003 | Bastiani et al. |
| 6,617,985 | B1 | 9/2003 | Poeppelman |
| 6,812,824 | B1 | 11/2004 | Goldinger et al. |
| 6,839,393 | B1 | 1/2005 | Sidiropoulos |
| 6,895,057 | B1 | 5/2005 | Balachandran et al. |
| 7,089,338 | B1 | 8/2006 | Wooten et al. |
| 7,707,349 | B1 | 4/2010 | Keithley |
| 7,984,214 | B2 | 7/2011 | Heizmann |
| 8,103,803 | B2 | 1/2012 | Reddy et al. |
| 8,103,896 | B2 | 1/2012 | Deshpande |
| 8,112,551 | B2 | 2/2012 | Sullam |
| 8,411,168 | B2 | 4/2013 | Oka |
| 8,549,198 | B2 | 10/2013 | Cohen et al. |
| 8,629,913 | B2 | 1/2014 | Cote et al. |
| 8,971,469 | B2 | 3/2015 | Imai et al. |
| 9,007,336 | B2 | 4/2015 | Shepelev et al. |
| 2001/0017594 | A1 | 8/2001 | Ahn |
| 2002/0024422 | A1 | 2/2002 | Turner et al. |
| 2004/0015752 | A1 | 1/2004 | Patella et al. |
| 2005/0138260 | A1 | 6/2005 | Love |
| 2005/0216815 | A1 | 9/2005 | Novotny et al. |
| 2005/0233789 | A1 | 10/2005 | Maekawa |
| 2006/0152342 | A1 | 7/2006 | Turner et al. |
| 2007/0016694 | A1 | 1/2007 | Achler |
| 2007/0088874 | A1 | 4/2007 | Brabant |
| 2007/0234136 | A1 | 10/2007 | Leef et al. |
| 2007/0297438 | A1 | 12/2007 | Meylan et al. |
| 2008/0005428 | A1 | 1/2008 | Maul et al. |
| 2008/0152026 | A1 | 6/2008 | Dahan et al. |
| 2008/0244370 | A1 | 10/2008 | Lam |
| 2009/0172491 | A1 | 7/2009 | Chen |
| 2009/0315899 | A1 | 12/2009 | Pourbigharaz et al. |
| 2009/0316724 | A1 | 12/2009 | Muukki et al. |
| 2010/0107039 | A1 | 4/2010 | Toda |
| 2011/0082957 | A1 | 4/2011 | Hayashita |
| 2011/0084900 | A1 | 4/2011 | Jacobsen et al. |
| 2011/0111700 | A1 | 5/2011 | Hackett |
| 2011/0239091 | A1 | 9/2011 | Toda |
| 2012/0117287 | A1 | 5/2012 | Kashima |
| 2012/0137022 | A1 | 5/2012 | Cala' |
| 2012/0259992 | A1 | 10/2012 | Koehler et al. |
| 2012/0331196 | A1 | 12/2012 | Erickson et al. |
| 2013/0018979 | A1 | 1/2013 | Cohen et al. |
| 2013/0039443 | A1 | 2/2013 | Garaschenko et al. |
| 2013/0305119 | A1 | 11/2013 | Kern et al. |
| 2014/0013017 | A1 | 1/2014 | Decesaris et al. |
| 2014/0025999 | A1 | 1/2014 | Kessler |
| 2014/0286466 | A1 | 9/2014 | Sengoku et al. |
| 2014/0337553 | A1 | 11/2014 | Du et al. |
| 2015/0030112 | A1 | 1/2015 | Wiley et al. |
| 2015/0046616 | A1 | 2/2015 | Pedersen et al. |
| 2015/0074305 | A1 | 3/2015 | Sengoku et al. |
| 2015/0095537 | A1 | 4/2015 | Sengoku |
| 2015/0100713 | A1 | 4/2015 | Sengoku |
| 2015/0100862 | A1 | 4/2015 | Sengoku |
| 2015/0199287 | A1 | 7/2015 | Sengoku |
| 2015/0199295 | A1 | 7/2015 | Sengoku |
| 2015/0234774 | A1 | 8/2015 | Sengoku |
| 2015/0248373 | A1 | 9/2015 | Sengoku |
| 2016/0147684 | A1 | 5/2016 | Sengoku |
| 2016/0217090 | A1 | 7/2016 | Sengoku et al. |
| 2016/0364353 | A1 | 12/2016 | Sengoku |

FOREIGN PATENT DOCUMENTS

| | | |
|---|---|---|
| CN | 1333964 A | 1/2002 |
| CN | 101835249 A | 9/2010 |
| CN | 102016975 A | 4/2011 |
| CN | 102567250 A | 7/2012 |
| CN | 102591834 A | 7/2012 |
| CN | 103946829 A | 7/2014 |
| DE | 10250616 C1 | 11/2003 |
| EP | 0192944 A2 | 9/1986 |
| EP | 0588191 A1 | 3/1994 |
| GB | 2173929 A | 10/1986 |
| JP | S5037305 A | 4/1975 |
| JP | S50147204 A | 11/1975 |
| JP | S59178842 A | 10/1984 |
| JP | H04358363 A | 12/1992 |
| JP | H05282244 A | 10/1993 |
| JP | H1032565 A | 2/1998 |
| JP | 2005210159 A | 8/2005 |
| JP | 2006120146 A | 5/2006 |
| JP | 2010250048 A | 11/2010 |
| JP | 2012039552 A | 2/2012 |
| JP | 2012194829 A | 10/2012 |
| WO | WO-198301360 | 4/1983 |
| WO | WO-198403598 | 9/1984 |
| WO | WO-0042740 A1 | 7/2000 |
| WO | WO-2013052886 A2 | 4/2013 |

OTHER PUBLICATIONS

International Search Report and Written Opinion—PCT/US2014/054778—ISA/EPO—dated Oct. 27, 2014.

Shanley T., et al., "PCI System Architecture—Edition 4th, Chapter 5 (106-119) and 14part (291-297)" In: May 31, 1999 (May 31, 1999), Addison-Wesley, XP055145686, the whole document.

Chen I A., et al., "An error-correction scheme with Reed-Solomon codec for CAN bus transmission", Intelligent Signal Processing and Communications Systems (ISPACS), 2011 International Symposium on, IEEE, Dec. 7, 2011, pp. 1-5, XP032114635, DOI: 10.1109/ISPACS.2011.6146059 ISBN: 978-1-4577-2165.

Corrigan S: "Introduction to the Controller Area Network (CAN)—Application ReportSLOA101AAug. 2002, Revised Jul. 2008", internet article, Jul. 30, 2008 (Jul. 30, 2008), XP002740955, texas Instruments Retrieved from the Internet: URL: http://www.ti.com/lit/an/sloa101a/sloa101a.pdf [retrieved on Jun. 16, 2015] the whole document paragraph [3.1.1].

(56) References Cited

OTHER PUBLICATIONS

"I2C—Inter-IC Corrununications, Lectures 28, Oct. 26-29, 2012", internet article, Oct. 29, 2012 (Oct. 29, 2012), XP002740959, Retrieved from the Internet: URL: http://ece.uidaho.edu/ee/classes/ECE340/LectureNotes/L27/I2C.pdf [retrieved on Jun. 16, 2015] the whole document p. 2.
International Search Report and Written Opinion—PCT/US2014/058920—ISA/EPO—dated Jan. 19, 2015.
International Search Report and Written Opinion—PCT/US2015/018202—ISA/EPO—dated Jun. 26, 2015.
"Tradeoffs when considering SPI or I2C?", internet article, Apr. 1, 2012 , XP002735900, Retrieved from the Internet:URL:http://electronics.stackexchange.com/questions/29037/tradeoffs-when-considering-spi-or-i2c [retrieved on Feb. 12, 2015].
"FAQ for MIPI I3C Version 1.0" MIPI Alliance, Dec. 12, 2017, 26 pages.
"MIPI Alliance I3C Whitepaper—Introduction to the MIPI I3C Standarized Sensor Interface" Aug. 2016, MIPI Alliance, 11 pages.
IEEE 100, "The authoritative Dictionary of IEEE Standards Terms", 2000, Seventh Edition, IEEE Standards Information Network, IEEE press, 1363 Pages.

METHOD AND APPARATUS TO ENABLE MULTIPLE MASTERS TO OPERATE IN A SINGLE MASTER BUS ARCHITECTURE

CROSS-REFERENCE TO RELATED APPLICATIONS

The present Application for Patent is a continuation-in-part of U.S. patent application Ser. No. 14/480,540, entitled "Method and Apparatus to Enable Multiple Masters to Operate in a Single Master Bus Architecture" filed Sep. 8, 2014 and which claims priority to Provisional Application No. App. No.: 61/875,547, entitled "Method and Apparatus to Enable a Multiple Masters to Operate in a Single Master Bus Architecture" filed Sep. 9, 2013, and the present application for patent is a continuation-in-part of U.S. patent application Ser. No. 14/595,030, entitled "Camera Control Interface Extension With In-Band Interrupt" filed Jan. 12, 2015 and which claims priority from Provisional Application No. App. No.: 61/927,102, entitled "Camera Control Interface Extension With In-Band Interrupt" filed Jan. 14, 2014, all of which applications are assigned to the assignee hereof and hereby expressly incorporated by reference herein.

FIELD

The present disclosure pertains to allowing several master devices to share control of a single-master bus, and to in-band interrupts on a bus shared by multiple master devices.

BACKGROUND

I2C (also referred to as I²C) is a multi-master serial single-ended bus used for attaching low-speed peripherals to a motherboard, embedded system, cellphone, or other electronic devices. The I2C bus includes a clock line (SCL) and a data line (SDA) with 7-bit addressing. The bus has two roles for nodes: master and slave. A master node is a node that generates the clock and initiates communication with slave nodes. A slave node is a node that receives the clock and responds when addressed by the master. The I2C bus is a multi-master bus, which means any number of master nodes can be present. Additionally, master and slave roles may be switched between messages (after a STOP is sent). I2C defines basic types of messages, each of which begins with a START and ends with a STOP.

In this context of a camera implementation, unidirectional transmissions may be used to capture an image from a sensor and transmit such image data to memory in a baseband processor, while control data may be exchanged between the baseband processor and the sensor as well as other peripheral devices. In one example, a Camera Control Interface (CCI) protocol may be used for such control data between the baseband processor and the image sensor (and/or one or more slave nodes). In one example, the CCI protocol may be implemented over an I2C serial bus between the image sensor and the baseband processor.

Legacy I2C implemented multi-master bus arbitration by allowing multiple master devices to drive or pull a bus line low during a slave identifier (ID) period. Whichever master device drives the bus line low the longest wins control of the bus. Unlike legacy I2C, CCI and CCI extension (CCIe) do not allow more than one CCIe device to drive the bus at any time, so the same bus arbitration method for master devices as I2C is not possible.

Therefore, a way is needed to allow a single-master bus to have multiple masters.

SUMMARY

Embodiments disclosed herein provide systems, methods and apparatus that can improve the performance of a serial bus that couples devices configured to communicate over the serial bus using different protocols and/or signaling schemes. In an aspect of the disclosure, a method, a computer-readable storage device, and an apparatus are provided.

According to certain aspects, a method of data communications operational on a first master device includes managing communications over a data bus for a plurality of devices coupled to the data bus, where two or more master devices are coupled to the data bus, determining when an in-band interrupt request has been asserted on the data bus, determining whether the in-band interrupt request on the data bus was asserted by a second master device, and handing over control of the data bus to the second master device when the second master device asserted the in-band interrupt request.

In some aspects, the method includes driving a first wire of the data bus to a first signaling state, releasing control of the first wire, where the first wire is initially held in the first signaling state by a pull-up resistor or a pull-down resistor. The method may include determining that the in-band interrupt request on the data bus was asserted when the first wire is driven to a second signaling state. In one example, the method includes providing one or more clock pulses on a second wire of the data bus after releasing control of the first wire. The method may include providing clock pulses on the first wire prior to releasing control of the first wire. In another example, the method includes transmitting a heartbeat word on the data bus when the data bus is operated in an inactive mode. The heartbeat word may provide clock information for a receiving device. Control of the first wire may be released during transmission of the heartbeat word. Control of the first wire may be released when the data bus is idle.

In some aspects, the method includes transmitting one or more commands to cause the plurality of devices coupled to the data bus to provide their corresponding device identifiers after determining that the in-band interrupt request has been asserted, and identifying a highest priority device requesting interrupt service based on the device identifiers.

In some aspects, handing over control of the data bus to the second master device includes transmitting a command to the second master device.

The data bus may be a two-wire serial bus.

According to certain aspects, a method operational on a first master device coupled to a data bus includes asserting an in-band interrupt request through the data bus while the data bus is controlled by a second master device, determining whether the second master device has released control of the data bus after assertion of the in-band interrupt request, and acquiring control of the data bus when the second master device has released control of the data bus.

Asserting the in-band interrupt request may include driving a first line of the data bus to a first logic level for a first period of time. The first period of time may occur between data transmissions on the data bus.

In some aspects, the method includes determining that a period of time when the first master device is receptive to in-band interrupt requests has commenced, asserting the in-band interrupt request by driving a first line of the data bus to a first signaling state during the period of time when the first master device is receptive to in-band interrupt requests, and releasing the first line of the data bus prior to expiration of the period of time when the first master device is receptive to in-band interrupt requests.

In some aspects, the method includes receiving one or more clock pulses from a second line of the data bus during the period of time when the first master device is receptive to in-band interrupt requests. Clock pulses may be received from the first line prior to the period of time when the first master device is receptive to in-band interrupt requests. The period of time when the first master device is receptive to in-band interrupt requests occurs during transmission of a heartbeat word. Control of the first line may be released when the data bus is idle.

In some aspects the method includes transmitting a device identifier to the second master device in response to a command received after asserting the in-band interrupt request.

In some aspects, the method includes masking signaling transitions on the first line from a clock recovery circuit during the period of time when the first master device is receptive to in-band interrupt requests.

The data bus may include a two-line serial bus.

In an aspect of the disclosure, an apparatus for data communication includes a serial data bus having a first wire and a second wire, the first wire being coupled to a pull-up or pull-down resistor. The apparatus may include a plurality of devices coupled to the serial data bus, including a first master device and a second master device. The first master device may be configured to manage communications over the serial data bus for a plurality devices coupled to the serial data bus, and drive the first wire to a first signaling state, release control of the first wire, where the first wire is initially held in the first signaling state by the pull-up or pull-down resistor. The first master device may be configured to determine that an in-band interrupt request on the serial data bus was asserted when the first wire is driven to a second signaling state. The second master device may be configured to determine that a period of time when the first master device is receptive to interrupts has commenced, assert the in-band interrupt request by driving the first wire of the serial data bus to the second signaling state during the period of time when the first master device is receptive to interrupts, and release the first wire of the serial data bus prior to expiration of the period of time when the first master device is receptive to interrupts.

In some aspects, the first master device is configured to provide one or more clock pulses on the second wire of the serial data bus after releasing control of the first wire. The first master device may be configured to provide clock pulses on the first wire prior to releasing control of the first wire. The second master device may be configured to mask signaling transitions on the first wire from a clock recovery circuit during the period of time when the first master device is receptive to in-band interrupt requests.

In some aspects, control of the first wire is released during transmission of a heartbeat word or when the serial data bus is idle.

In some examples, the apparatus includes one or more slave devices coupled to the serial data bus. The first master device may be configured to transmit one or more commands addressed to the one or more slave devices and the second master device after determining that the in-band interrupt request has been asserted. The first master device may be configured to receive an indication of the in-band interrupt request in response to the one or more commands.

The serial data bus may include a two-wire serial bus.

In an aspect of the disclosure, an apparatus for data communication includes means for managing communications over a multi-wire bus for a plurality of devices coupled to the multi-wire bus, where two or more master devices are coupled to the multi-wire bus. The apparatus may include means for providing clock information on the multi-wire bus, means for providing an interrupt opportunity for plurality of devices, means for determining when an in-band interrupt request has been asserted during the interrupt opportunity, and means for identifying a source of in-band interrupt requests asserted on the serial data bus.

In some aspects, the means for providing an interrupt opportunity is configured to drive a first wire of the multi-wire bus to a first signaling state, and release control of the first wire, where the first wire is initially held in the first signaling state by a pull-up resistor or a pull-down resistor. The means for providing an interrupt opportunity may be configured to determine that the in-band interrupt request on the multi-wire bus was asserted when the first wire is driven to a second signaling state.

The means for providing clock information on the multi-wire bus may be configured to provide clock pulses on a first wire of the multi-wire bus prior to releasing control of the first wire, and provide one or more clock pulses on a second wire of the multi-wire bus after releasing control of the first wire.

DRAWINGS

Various features, nature, and advantages may become apparent from the detailed description set forth below when taken in conjunction with the drawings in which like reference characters identify correspondingly throughout.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Overview

A first feature provides a way for a plurality of master devices to share a single-master bus. In some bus architectures (e.g., CCI and CCIe), only a single master is allowed to control the shared data bus. To accommodate operation of multiple master devices in such bus architectures, a mechanism is provided for a new master device to trigger an IRQ signal over a shared, single line interrupt (IRQ) bus. The current master device then polls the other master devices over the shared data bus to ascertain which master device is asserting the IRQ signal. Upon identifying the asserting master device, the current master device grants control of the data bus to the new master device.

According to one aspect, the other master devices may operate in master mode only. According to a second aspect, the other master devices may be slave devices that are able to switch to master device operation by requesting use of the data bus from a current master device of the data bus.

Exemplary Method for Transferring Master Authority

Figure 1:
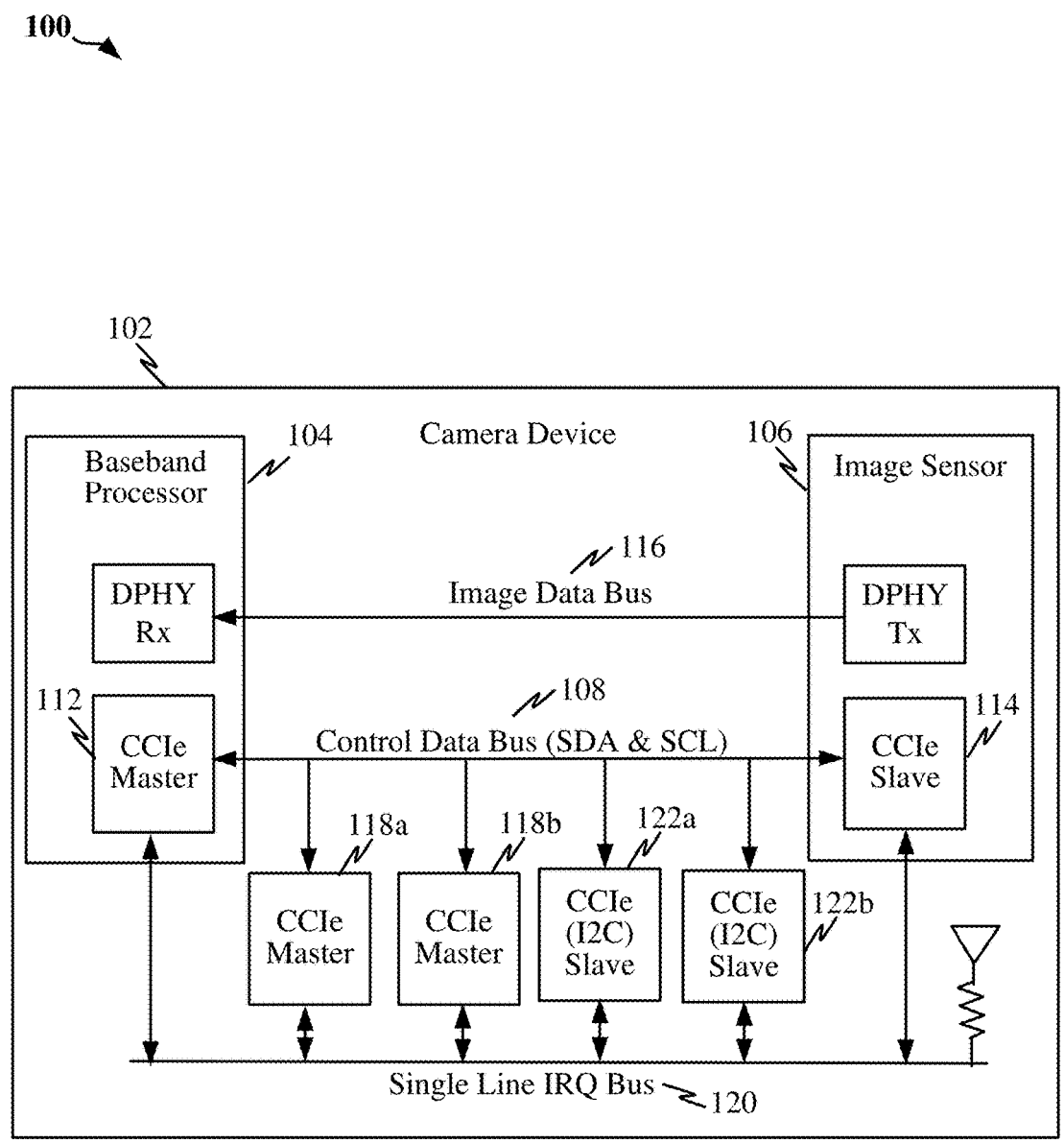
FIG. 1 is a block diagram illustrating a device having a baseband processor and an image sensor and implementing an image data bus and a control data bus.

FIG. 1 is a block diagram illustrating a device 102 having a baseband processor 104 and an image sensor 106 and implementing an image data bus 116 and a control data bus 108 (e.g., I2C bus). While FIG. 1 illustrates the control data bus 108 within a camera device, it should be clear that this control data bus 108 may be implemented in various different devices and/or systems. Image data may be sent from the image sensor 106 to the baseband processor 104 over an image data bus 116 (e.g., a high speed differential DPHY link). In one example, the control data bus 108 may comprise two wires, a serial clock line (SCL) and a serial data line (SDA). The SDA and SCL may be coupled to all devices 112, 114, 118, and 122 on the control data bus 108.

In this example, a CCIe master 112 is an active master coupled to a CCIe slave 114, a plurality of inactive masters 118a and 118b, and a plurality of CCIe (I2C) slave devices 122a and 122b. The control data bus 108 architecture allows for only one active master at a time. Additionally, the master(s) 112, 118 and slave devices 114 and 122 may be coupled to a shared single-line IRQ bus 120.

The inactive CCIe masters 118a and 118b may, in one implementation, be configured to operate solely as masters (e.g., they cannot operate as slaves). Generally, a "master" is a device coupled to the control data bus 108 and manages communications (from other devices) over the control data bus 108. In order to become an active master, the inactive masters may be given control (e.g., one at a time) over the control data bus 108 by a current master. For example, if the inactive master 118a desires to be active, the inactive master 118a asserts an IRQ signal on the IRQ bus 120 (e.g., by pulling down the single line shared IRQ bus 120). The currently active master 112 receives the interrupt signal and then polls/scans all devices coupled to the control data bus 108 to determine which device asserted the interrupt and for what reason. For example, a slave 114 may request temporary use of the control data bus 108. Additionally, an inactive master 118a and/or 118b may make a master request. That is, the inactive master 118a and/or 118b makes a request to take over and control the control data bus 108 for more than a temporary time. Typically, the newly active master controls the control data bus 108 indefinitely or until another inactive master seeks control. According to one aspect, the shared single line IRQ bus 120 is coupled to the slave devices 114, 122a, and 122b as well as to the master devices 112, 118a, and 118b. This shared IRQ line 120 may be pulled up (e.g., pull high) and may be pulled low when a slave device asserts an IRQ signal. That is, each slave device 114, 122a, and 122b may independently request access to transmit on the control data bus 108 by sending an IRQ signal (e.g., request) to the master device 112.

Control data may be exchanged between the baseband processor 104 and the image sensor 106 as well as other peripheral devices 114, 122a, and 122b (slave devices) via the control data bus 108.

In some examples, the single line IRQ bus may be an asynchronous bus (e.g., unmanaged by a master device or any other device). This means that the slave devices can unilaterally assert an IRQ signal at any time. In another example, the single line IRQ bus may be dedicated to unidirectional signal transmissions from slave devices to the master devices. That is, the single line IRQ bus may be used for only IRQ signals and no other types of signals. In one example, the control data bus 108 may be a camera control interface (CCI) or CCI extension compatible bus. In another example, the control data bus may be a bidirectional bus between the slave devices and the master device.

According to one aspect, an improved mode of operation (i.e., greater than 1 MHz) may be implemented over the multi-mode control data bus 108 to support camera operation. This improved mode of operation over an I2C bus may be referred to as a camera control interface extension (CCIe) mode when used for camera applications. In this example, the baseband processor 104 includes a master node 112 and the image sensor 106 includes a slave node 114, both the master node 112 and slave node 114 may operate according to the camera control interface extension (CCIe) mode over the control data bus 108 without affecting the proper operation of other legacy I2C devices, such as slave devices 122a and 122b, coupled to the control data bus 108. According to one aspect, this improved mode over the control data bus 108 may be implemented without any bridge device between CCIe devices and any legacy I2C slave devices 122a and 122b. According to one aspect, legacy I2C devices 122a and 122b may operate in a first mode having a first clock, first bus speed, and/or first signal protocol, while CCIe-capable devices may operate in a second mode having a second clock, second bus speed, and/or second protocol. The first clock, first bus speed, and/or first signal protocol may be distinct from the second clock, second bus speed, and/or second protocol. For example, the second clock and/or second bus speed may be faster or have greater speed than the first clock and/or first bus speed, respectively.

According to one aspect, all slave devices 114, 122a, and 122b may be CCIe-capable devices so that there is no need to switch between the first mode and second mode of operation. That is, all signaling and/or communications over may be performed according to the second mode (e.g., at a second clock, second bus speed, and/or a second protocol). For example, because the second mode may provide a greater bit rate than the first rate, there is no need to switch back and forth between the first mode and second mode. In fact, because legacy devices compatible with the first mode need not be accommodated, a third mode of operation may be implemented that provides a higher/greater bit rate than the second mode.

Figure 2:
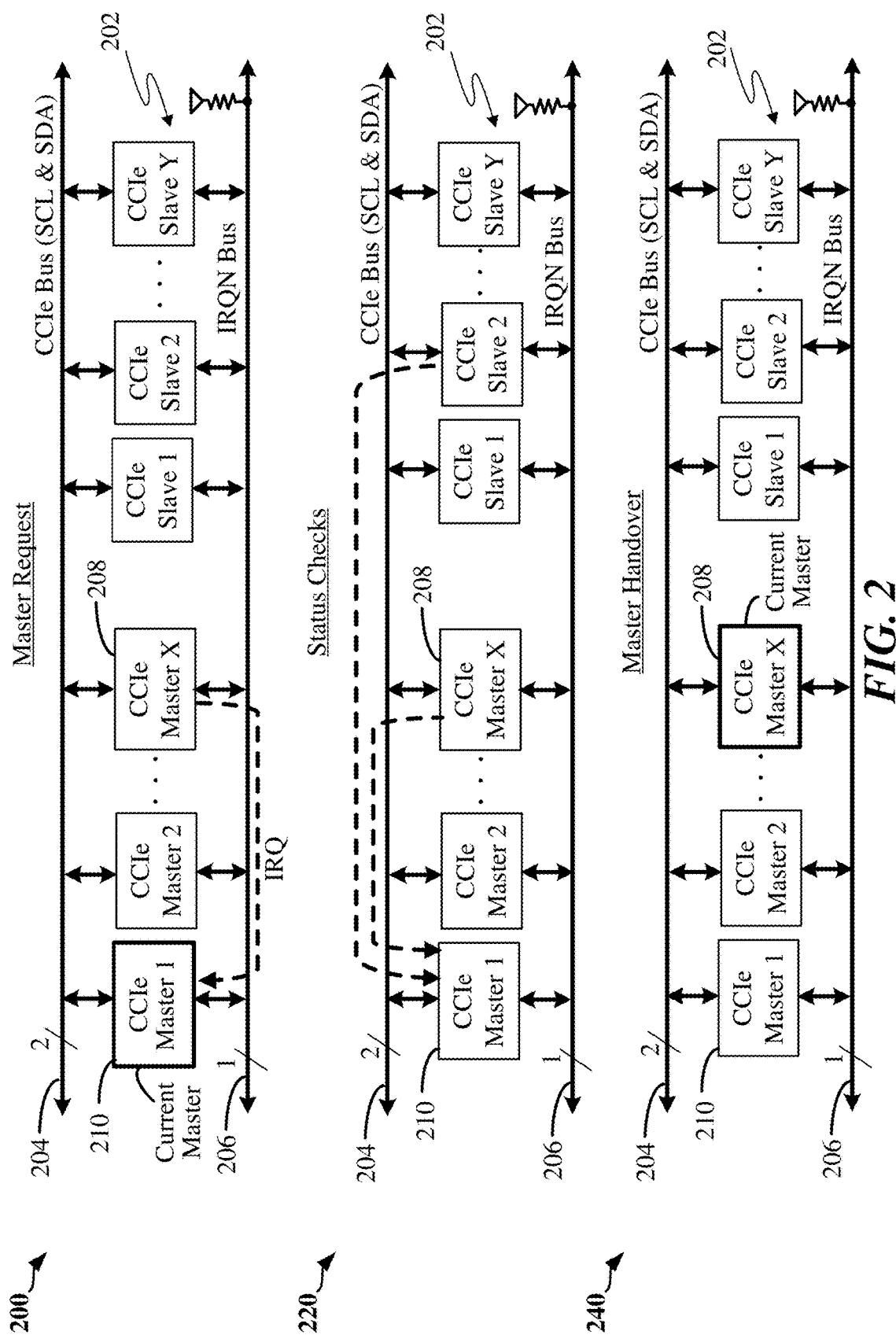
FIG. 2 illustrates a master request and handover operation in a system including a plurality of master and/or slave devices coupled to a CCIe bus and an interrupt (IRQ) bus.

FIG. 2 illustrates a master request and handover operation in a system including a plurality of master and/or slave devices 202 coupled to a CCIe bus 204 (e.g., a control data bus) and an IRQ bus 206. An inactive master X 208 asserts an interrupt signal on the IRQ bus 206. The currently active master 1 210 (the current master) receives the asserted interrupt signal. Master 1 210 polls each inactive master over the CCIe bus 204 to ascertain which device asserted the IRQ signal. Upon identifying the asserting master, the currently active master 210 relinquishes control of the CCIe bus 204 and the asserting inactive master 208 becomes the new currently active master.

In one example, such polling of inactive masters to ascertain the asserting master may check (e.g., request to read) one or more status registers within each inactive master being polled. In one example, such status registers may indicate whether a device triggered/asserted an IRQ signal and/or if such assertion is for a master request (e.g., request to become a master of the control data bus). In one example, conveying such status register (or other information over the CCIe bus) indicating a master request to a current master by an inactive master (after asserting an IRQ signal) may be sufficient for the inactive master to take control of the CCIe bus 204. In other implementations, the inactive master (e.g., after being polled by the currently active master) may receive an additional message from the currently active master indicating that it now has control of the CCIe bus and should become the active master.

In some implementations, like CCI and CCIe, a specific mechanism to indicate whether a master request is being asserted may not be available (e.g., since status registers were not intended to support multiple masters). Consequently, a way is needed to permit an inactive master to indicate it wishes to take control of the CCIe bus 204 as its new master.

According to a first feature, a spare bit is available because only 19 bits out of 20 bits are used for data. This spare bit may be used to indicate a master request.

A typical I2C bus includes SCL and SDA lines. However, according to one feature, the CCIe bus 204 may reuse these two lines for coded data transmissions in which the clock is embedded within symbol transmissions.

Figure 3:
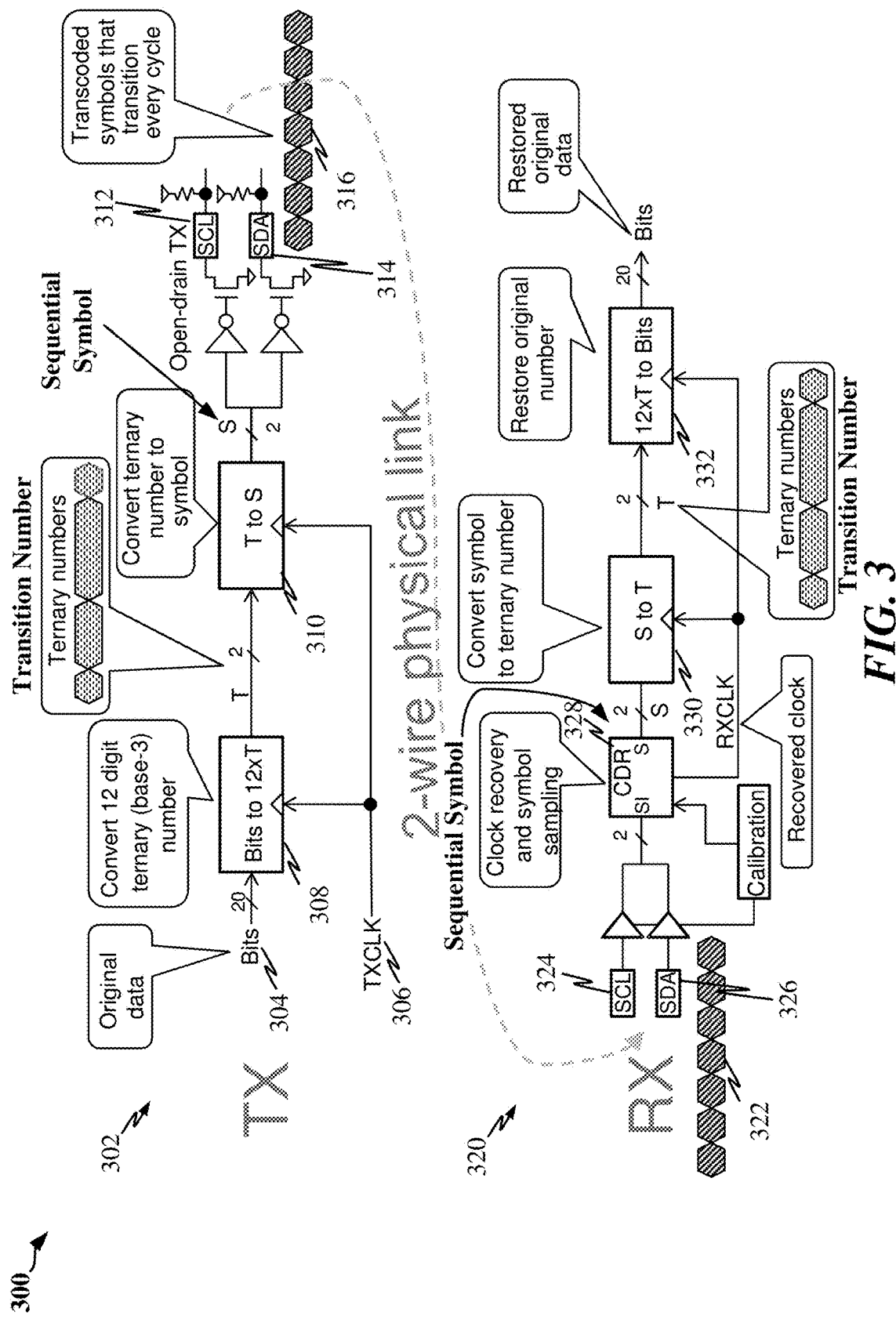
FIG. 3 is a block diagram illustrating an exemplary method for transcoding of data bits into transcoded symbols at a transmitter to embed a clock signal within the transcoded symbols.

FIG. 3 is a block diagram illustrating an exemplary method for transcoding of data bits into transcoded symbols at a transmitter to embed a clock signal within the transcoded symbols. At the transmitter 302, a sequence of data bits 304 are converted into a ternary (base 3) number (i.e., a "transition number"), and the ternary numbers are then converted into (sequential) symbols which are transmitted over the clock line (SCL 312) and the data line (SDA 314). In one example, an original 20-bits of binary data is input to a bit-to-transition number converter block 308 to be converted to a 12-digit ternary number. Each digit of the 12-digit ternary number may represent a "transition number". Two consecutive transition numbers may have the same digit. Each transition number is converted into a sequential symbol at a transition-to-symbol block 310 such that no two consecutive sequential symbols have the same values. Because a transition is guaranteed at every sequential symbol, such sequential symbol transition may serve to embed a clock signal. Each sequential symbol 316 is then sent over a two wire physical link (e.g., I2C bus comprising a SCL 312 and a SDA 314).

Figure 4:
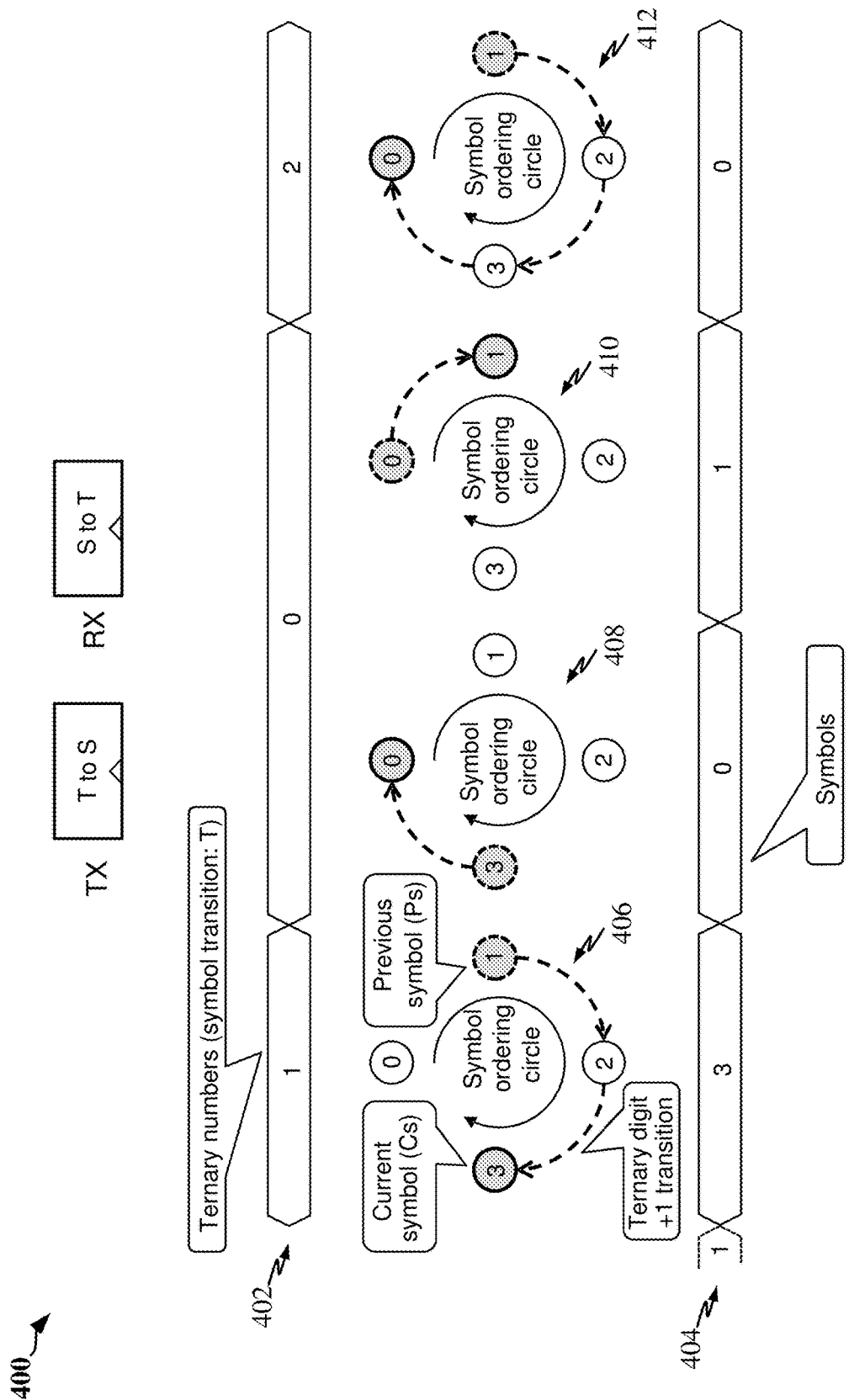
FIG. 4 illustrates one example of converting between ternary numbers (transition number) and (sequential) symbols.

FIG. 4 illustrates one example of converting between ternary numbers (transition number) 402 and (sequential) symbols 404. A ternary number, base-3 number, also referred to as a transition number, can have one of the three possible digits or states, 0, 1, or 2. While the same value may appear in two consecutive digits of a ternary number, no two consecutive symbols have the same value.

The conversion function adds the transition number plus 1 to the previous raw symbol value. If the addition results in a number larger than 3, it rolls over from 0, then the result becomes the state number for the current symbol.

In a first cycle 406, a previous symbol is 1 when first transition number 1 is input, so transition number 1 plus 1 is added to the previous symbol, and the result 3 becomes the current symbol state that is sent to the physical link.

In a second cycle 408, the transition number 0 is input in the next cycle, and transition number 0 plus 1 is added to the previous symbol 3. Since the result of the addition, 4, is larger than 3, the rolled over number 0 becomes the current symbol.

In a third cycle 410, the same transition number 0 is input. The conversion logic adds 1 to the previous symbol 0 to generate current symbol 1.

In a fourth cycle 412, the transition number 2 is input. The conversion logic adds the transition number 2 plus 1 to the previous symbol 1 to generate current symbol 0 (since the result of the addition, 4, is larger than 3, the rolled over number 0 becomes the current symbol).

Consequently, even if two consecutive ternary digits 402 have the same numbers, this conversion guarantees that two consecutive symbol numbers have different state values. Because of this, the guaranteed symbol transition in the sequence of symbols 404 may serve to embed a clock signal, thereby freeing the clock line SCL in an I2C bus for data transmissions.

Referring again to FIG. 3, at the receiver 320 the process is reversed to convert the transcoded symbols back to bits and, in the process, a clock signal is extracted from the symbol transition. The receiver 320 receives a sequence of sequential symbols 322 over the two wire physical link (e.g., I2C bus comprising the SCL 324 and the SDA 326). The received sequential symbols 322 are input into a clock-data recovery (CDR) block 328 to recover a clock timing and sample the transcoded symbols (S). A symbol-to-transition number converter block 330 then converts the transcoded (sequential) symbols to a transition number, i.e., one ternary digit number. In this example, a transition number-to-bits converter 332 converts 12 transition numbers to restore 20 bits of original data from the 12 digit ternary number.

This technique illustrated herein may be used to increase the link rate of a control data bus 108 (FIG. 1) or 204 (FIG. 2) beyond what the I2C standard bus provides and is referred hereto as CCIe mode. In one example, a master node and/or a slave node coupled to the control data bus 108 may implement transmitters and/or receivers that embed a clock signal within symbol transmissions (as illustrated in FIG. 3) in order to achieve higher bit rates over the same control data bus than is possible using a standard I2C bus.

Figure 5:
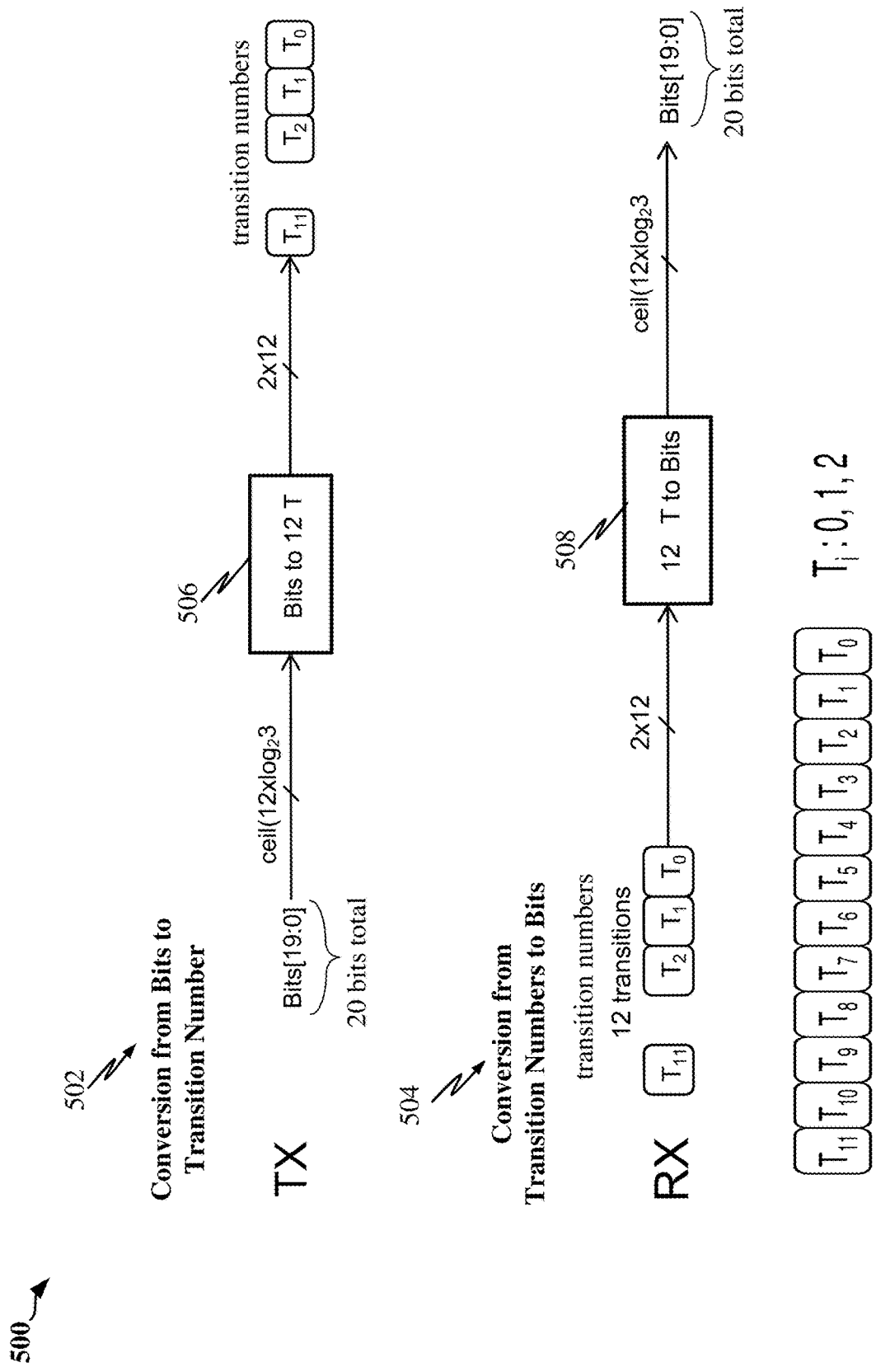
FIG. 5 illustrates an exemplary conversion from bits to transition numbers at a transmitter and then from transition numbers to bits at a receiver.

FIG. 5 illustrates an exemplary conversion from bits to transition numbers at a transmitter 502 and then from transition numbers to bits at a receiver 504. This example illustrates the transmission for a 2-wire system using 12 transition symbols. The transmitter 502 feeds binary information, Bits, into a "Bits to 12×T" converter 506 to generate 12 symbol transition numbers, T0 to T11. The receiver 504 receives 12 symbols transition numbers, T0 to T11, which are fed into a "12×T to Bits" converter 508 to retrieve the binary information (Bits). If there are r possible symbol transition states per one T, T0 to T11, 12 transitions can send $r^{12}$ different states. For a 2-wire bus, $r=2^2-1$. Consequently, transitions T0 . . . T11 contain data that can have $(2^2-1)^{12}$ different states. Consequently, $r=4-1=3$ and the number of states$=(4-1)^{12}=531441$.

In this example for 2-wire system using 12 symbol transition numbers, it may be assumed the possible symbol transitions per one T, r is 3 ($=2^2-1$). If the number of symbols in a group 12, a 12-digit ternary number (base-3 number): T11, T10, . . . , T2, T1, T0, where each Ti: 0, 1, 2, may be used. For example, for {T11, T10, . . . T2, T1, T0}={2, 1, 0, 0, 1, 1, 0, 1, 0, 1, 2, 1}, the ternary number is:

$2100\_1101\_0121_3$(Ternary number) $=2\times 3^{11}+1\times 3^{10}+ 0\times 3^9+0\times 3^8+1\times 3^7+1\times 3^6+0\times 3^5+1\times 3^4+0\times 3^3+ 1\times 3^2+2\times 3^1+1\times 3^0=416356(0x65A64)$.

In this manner, 12 transitions numbers may be converted into a number. Note that the ternary number 2100,1101, $0121_3$ may be used as the transition number, for example, in FIG. 3, so that each integer may be mapped to a sequential symbol and vice versa.

The example illustrated for a 2-wire system and 12 symbol transition numbers may be generalized to an n-wire system and m symbol transition numbers. If there are r possible symbol transition states per one T, T0 to Tm-1, m transitions can send $r^m$ different states, i.e., $r=2^n-1$. Consequently, transitions T0 . . . Tm-1 contain data that can have $(2^n-1)^m$ different states.

Figure 6:
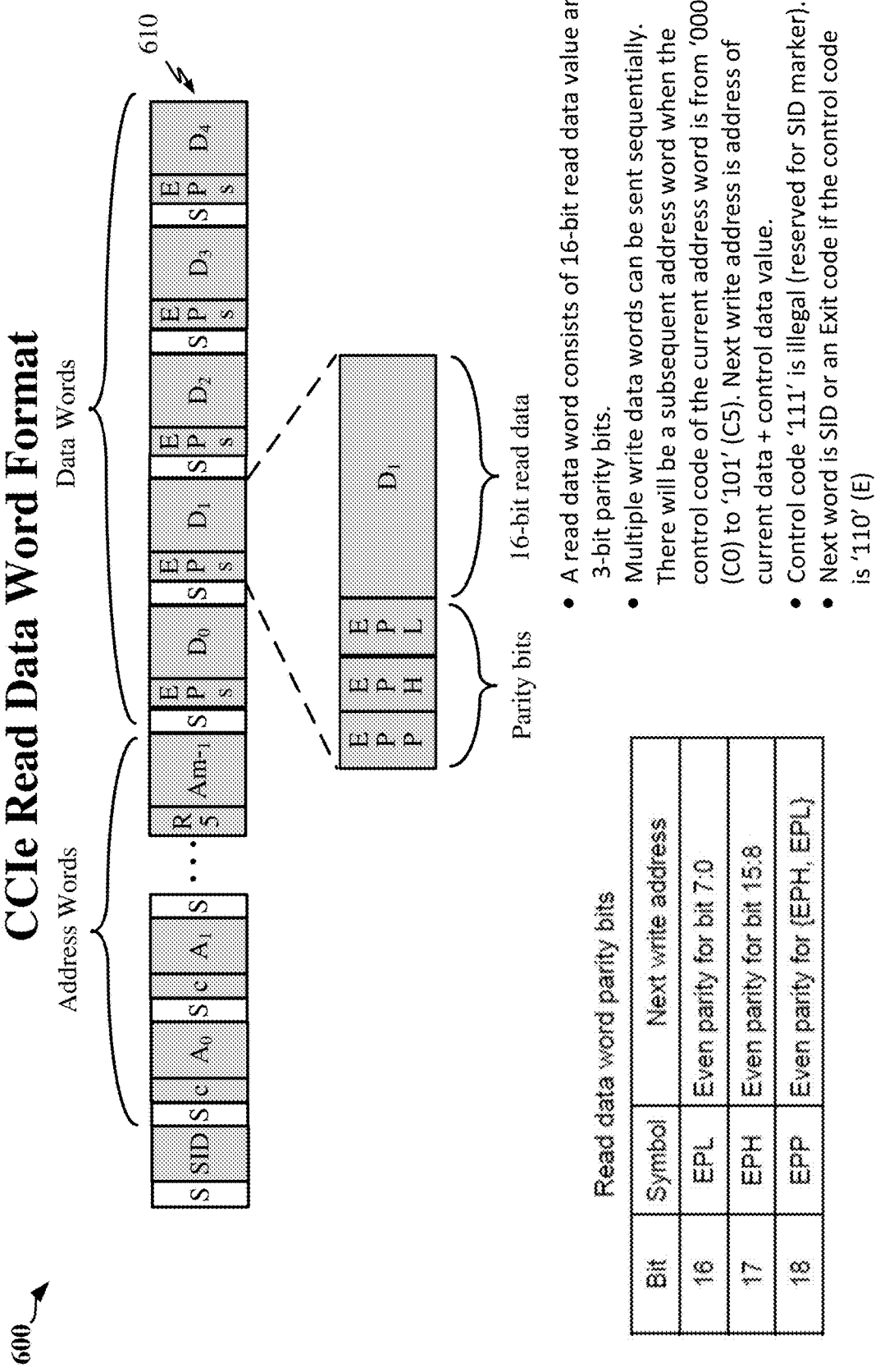
FIG. 6 illustrates a data word where 16 bits, (0 to 15) are read data and 3 bits are parity bits (16-18).

FIG. 6 illustrates a data word 610 where 16 bits, (bits 0 to 15) are read data and 3 bits are parity bits (16-18). In other words, a read data word may consist of a 16-bit read data value and 3-bit parity bits. There will be a subsequent address word when the control code of the current address word is from '000' (C0) to '101' (C5). The next write address is the address of current data plus a control data value. A control code of '111' is illegal because it is reserved for a SID marker. Next word is a SID (slave ID) or an Exit code if the control code is '110' (E). Not shown in FIG. 6 is that the data word 610 can have a spare bit (e.g., the $20^{th}$ bit or also referred to a "bit 19" when the bit count starts at the $0^{th}$ bit) used to indicate an inactive master device attempting to become an active master device as described herein. The transcoding scheme illustrated in FIGS. 3-5 shows that 19 bits (which may be referred to as bits 0-18) may be utilized by the data word 610 may be coded for transmission over the CCIe bus 204 (FIG. 2). But the transcoding scheme can effectively transmit at least 20 bits within the 12-digit ternary number. When bit 19 is set, bits 13~18 are always 0, and bits [12:0] can represent only from 0x0000 up to 0x1BF0. Consequently, bit 19 ($20^{th}$ bit) may be used by an inactive master to indicate a master request.

Figure 7:
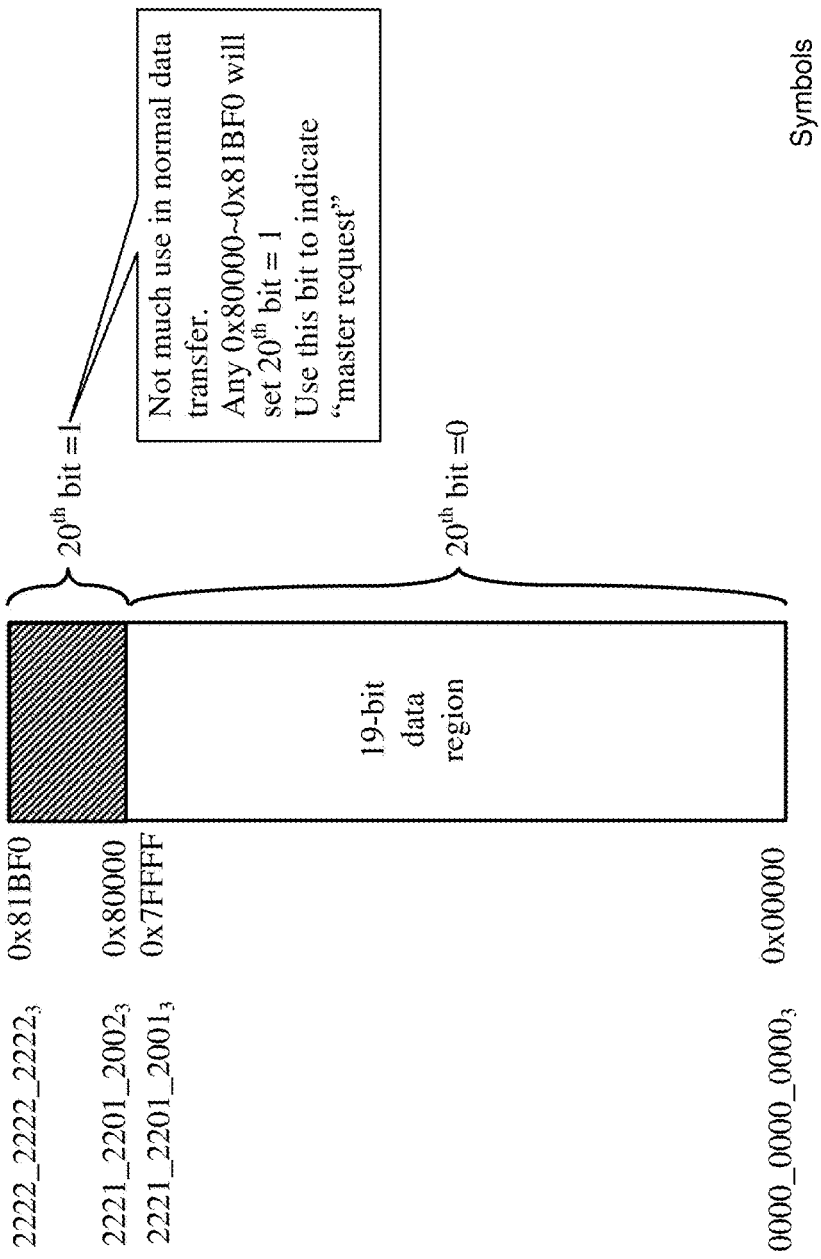
FIG. 7 illustrates the availability of an extra ($20^{th}$) bit resulting from the encoding scheme illustrated in FIGS. 3, 4, and 5.

FIG. 7 illustrates the availability of an extra ($20^{th}$) bit resulting from the encoding scheme illustrated in FIGS. 3, 4, and 5. As is typical in the computer sciences, counting bit wise begins at zero, a $20^{th}$ bit is often referred to as bit 19. Here, the bits 0-18 are represented within the ternary number range of $0000\_0000\_0000_3$ to $2221\_2201\_2001_3$. The ternary numbers in the range of $2221\_2201\_2002_3$ to $2222\_2222\_2222_3$ are unused. Consequently, the ternary number range $2221\_2201\_2002_3$ to $2222\_222\_2222_3$ may be used to represent bit 19 (i.e., $20^{th}$ bit). In other words, $2221\_2201\_2002_3$ ternary is 1000_0000_0000_0000_0000 binary (0x80000 hexadecimal) and $2222\_2222\_2222_3$ ternary (0x81BF0) is the largest 12 digit ternary number possible. In one implementation of a master request, the $20^{th}$ bit (bit 19) is set to 1 by an asserting inactive master.

Figure 8:
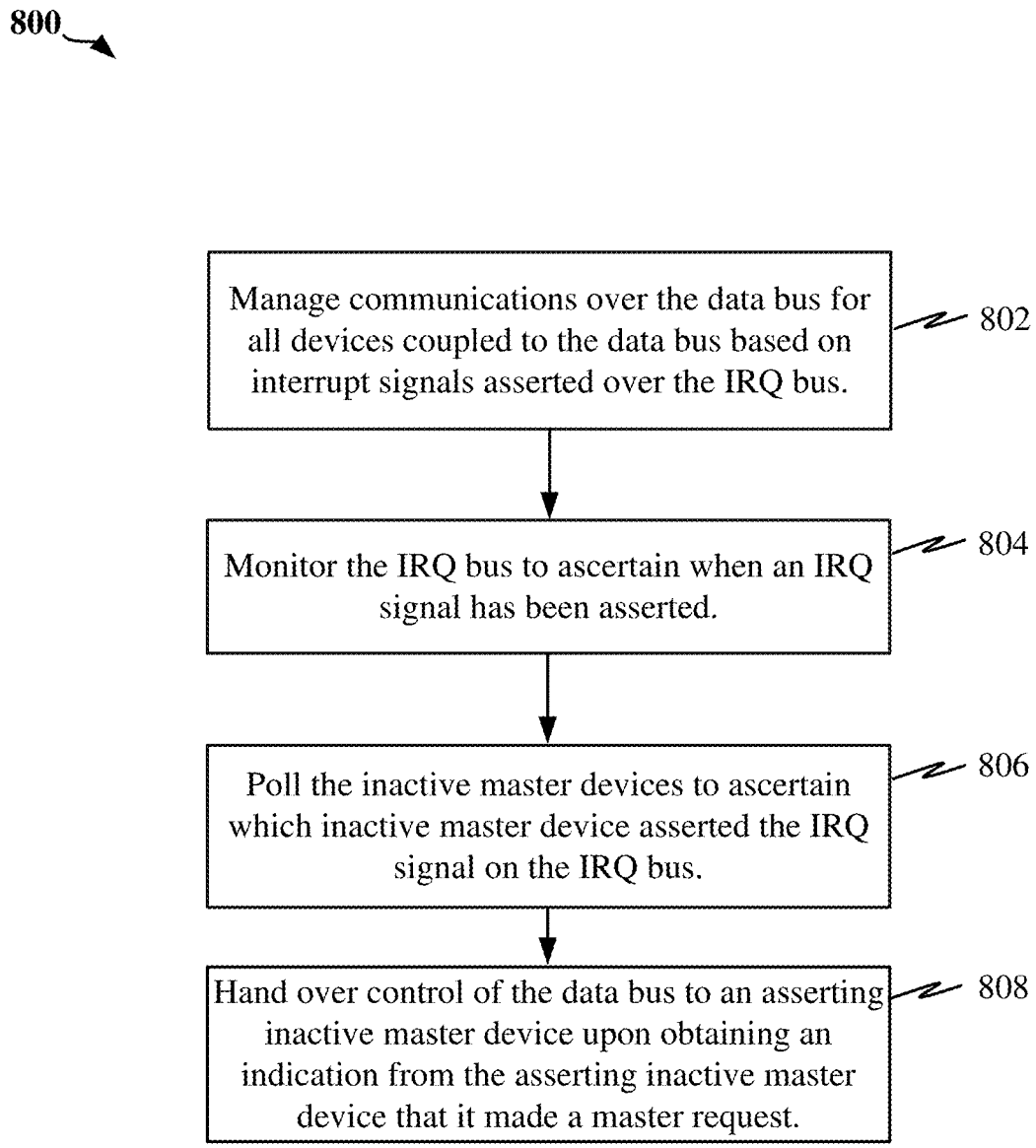
FIG. 8 illustrates a first method that includes grouping a plurality of devices coupled to a shared single line interrupt request (IRQ) bus into two or more groups, where each group is associated with a different IRQ signal.

FIG. 8 illustrates a method for an active master device to transfer control of a data bus to an inactive master device. The active master device may be coupled to a control data bus and a shared single line interrupt (IRQ) bus. A plurality of inactive master devices and/or slave devices may also be coupled to the control data bus and shared single line interrupt bus. The active master device may manage communications over the data bus for all devices coupled to the data bus based on interrupt signals asserted over the IRQ bus. The active master device may monitor the IRQ bus to ascertain when an IRQ signal has been asserted 804. The master device may then poll the inactive master devices to ascertain which inactive master device asserted the IRQ signal on the IRQ bus 806. Upon obtaining an indication from one of the inactive master devices that it made a master request, the active master hands over control of the data bus to the asserting inactive master device 808.

Figure 9:
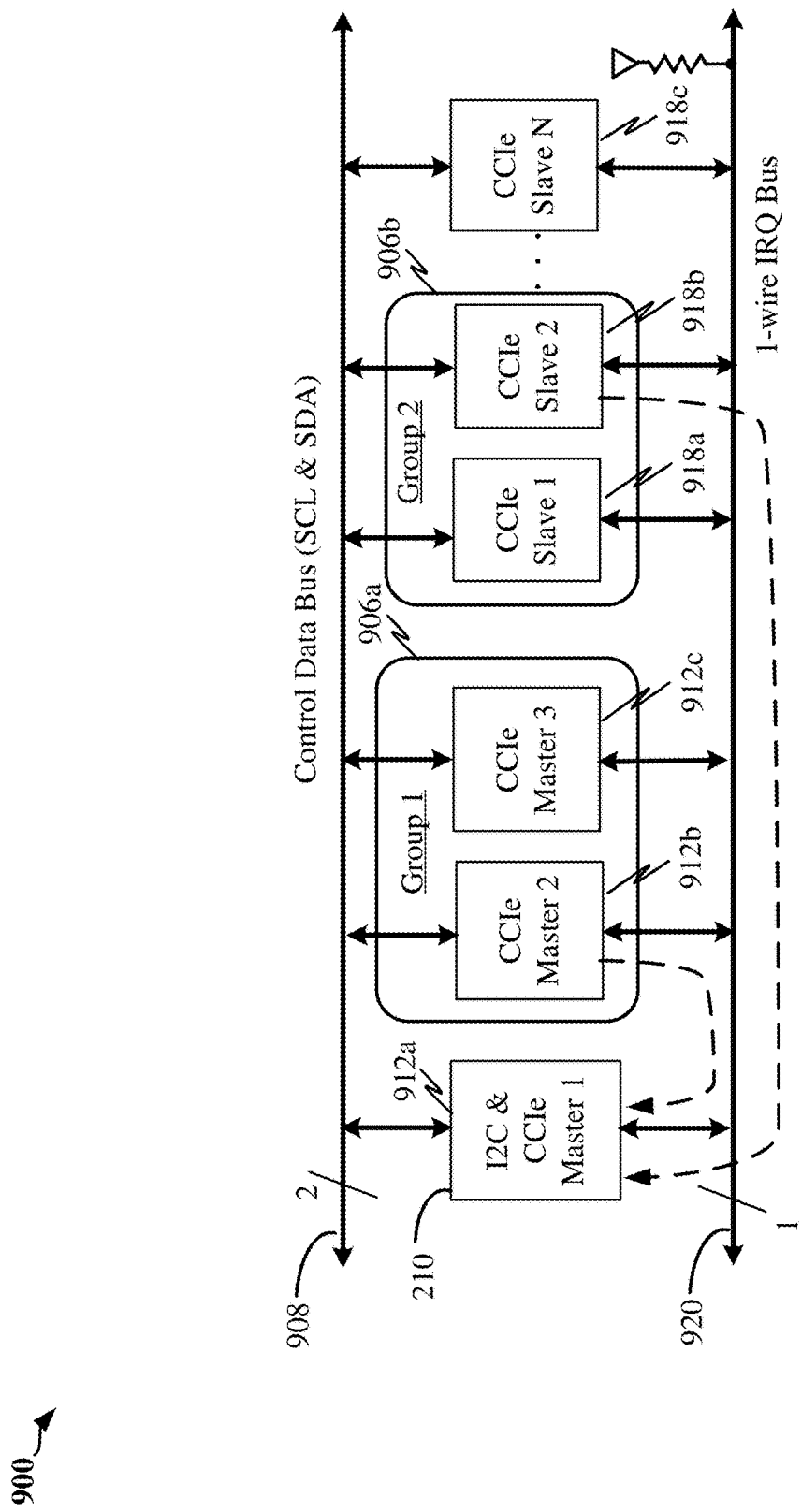
FIG. 9 is a block diagram illustrating how a single wire IRQ bus may be shared by a plurality of slave devices and one or more master device(s).

FIG. 9 is a block diagram illustrating how a single wire IRQ bus 920 may be shared by a plurality of slave devices 918*a-c* and one or more master device(s) 912*a-c*, and where the requesting and transferring of master control as shown in FIG. 2 can be implemented. In this example, the slave devices 918*a-c* and master devices 912*a-c* may be logically grouped (e.g., Group-1 906*a*, Group-2 906*b*, etc.). Such groupings may be, for example, pre-configured or dynamically defined (e.g., by enumeration) upon boot-up by the active master 1 device 912*a*, where master devices 2 and 3 912*b-c* are inactive. Such groupings allow the master device 912*a* to more quickly identify which slave device and/or inactive master device triggered an IRQ signal on the IRQ bus 920 without unacceptable delays.

Figure 10:
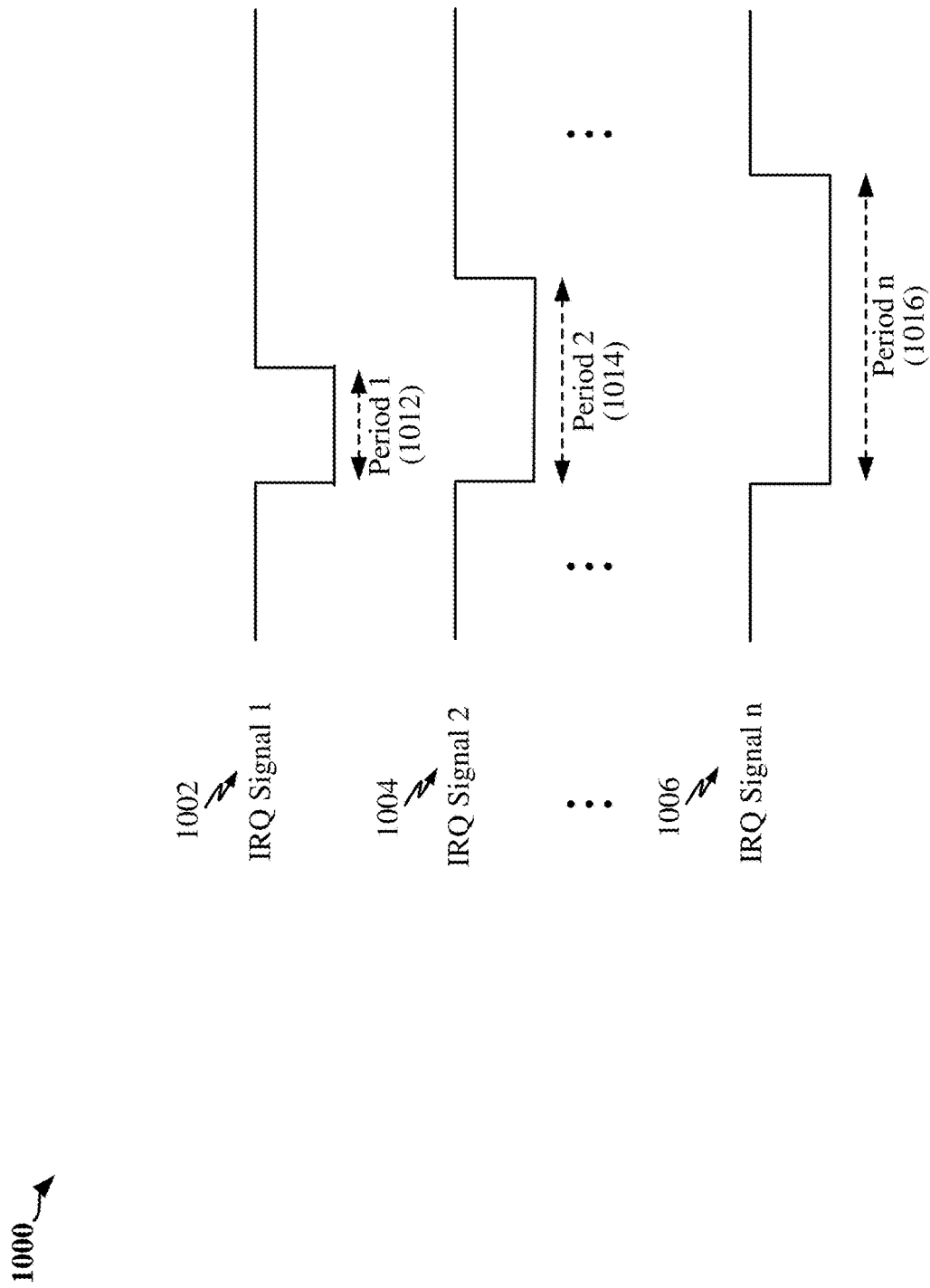
FIG. 10 illustrates examples of different IRQ signals in accordance with certain aspects disclosed herein.

Each group of devices 906*a* and 906*b* may have a distinct IRQ signal (e.g., illustrated in FIG. 10). For instance, a first group 906*a* may use a first signal having a first period, a second group 906*b* may use a second signal having a second period, and so on. For example, the "period" may be a length of time for which the IRQ bus 920 is pulled low by the asserting slave device. Note that other forms of signal differentiation may be used, e.g., different voltage levels for the IRQ signals used by different groups of slave devices, etc. In one implementation, a "group" of devices may define a logical group, such that each "group" may include a single device. In other implementations, each "group" may include 2, 3, and/or 4 devices or more. The number of slave devices or master devices per group may be a function of how long it would take to query and identify an asserting device. For instance, if all devices coupled to the IRQ bus 920 have to be queried by the active master device 912*a*, this may cause an unacceptably long delay. Consequently, grouping devices and using distinct IRQ signals for each group allows the master device 912*a* to identify an asserting device that has its bit 19 set to indicate a master request. Additionally, although shown as inactive masters grouped together 906*a* and slaves grouped together 906*b*, inactive masters and slaves can be grouped together.

The master device 912*a* detects the occurrence of an IRQ signal on the shared single line IRQ bus 920 and queries each device in the group to identify which device triggered or asserted the IRQ signal. For example, if the IRQ signal identifies a group-2 906*b* slave device, then the active master device 912*a* may send a register status request (via the control data bus 908) to a first slave device 918*a* within group-2.

If the first slave device 918*a* status response indicates that it is not the asserting slave device, then the master device 912*a* may send another register status request (via the control data bus 908) to a second slave device 918*b* within group-2. This process is repeated for all slave devices in group-2 906*b* until the slave device that asserted the IRQ signal is identified (in one implementation where a slave is capable of being a master). This process is repeated for all slave devices in group-2 906*b* until the slave device that asserted the IRQ signal is identified. This is one method to scan IRQ status from a group, where scanning stops when a first requesting slave is found (e.g., even if there may be more requesting slaves in the group). When this method is used, the master must indicate or globally notify that it serves only the request from the first requesting slave, so that those slaves not being serviced can know that they will have to reissue IRQs to be serviced.

Another method to scan for IRQ status from a group is to scan all the slaves in the group (and continue scanning even after detecting a first requesting slave) and keep a list of all requesting slaves. This way, the currently active master may find multiple requesting slaves and service all requests without having the slaves reissue IRQs.

Similarly, the active master 912*a* can be signaled from one of the inactive masters 912*b-c*. For example, if the IRQ signal identifies a group-1 906*a*, then the active master device 912*a* may send a register status request (via the control data bus 908) to the first inactive master device 912*b* within group-1.

If the first inactive master device 912*b* status response indicates that it is not the asserting inactive master device, then the active master device 912*a* may send another register status request (via the control data bus 908) to a second inactive master device 912*c* within group-1. This process is repeated for all inactive master devices in group-1 906*a* until the inactive master device that asserted the IRQ signal is identified. Moreover, when the inactive master device has its IRQ status register's bit 19 set, then the current master makes that inactive master active. As used herein the term active master means actively controlling the control data bus. In addition, an inactive master can be doing internal activities as well as external activities, however the inactive master does not have current control over the control data bus. Therefore, inactive does not mean no activity, rather it only means that the device it is not actively controlling or managing communications or use of the control data bus at that moment.

FIG. 10 illustrates examples of different IRQ signals that may be assigned or associated with different groups. This example illustrates a first IRQ signal 1002 having a first period, a second IRQ signal 1004 having a second period, and a third IRQ signal 1006 having a third period. Additionally, any method of differentiating the different groups can be employed to identify the group sending the interrupt request. In one example, a particular signal may be assigned to all inactive master devices and may be used to indicate a master request over the IRQ bus.

Figure 11:
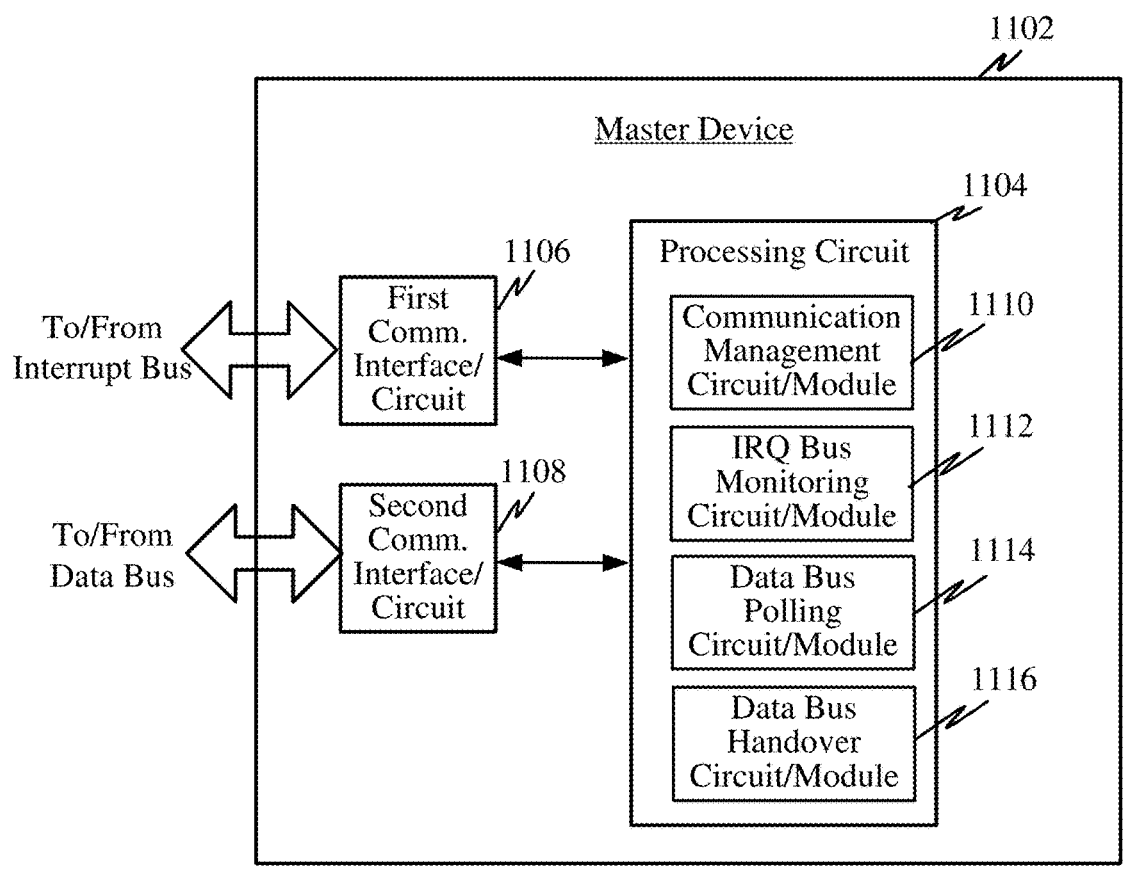
FIG. 11 is a block diagram illustrating an exemplary master device adapted for multi-master operation over a single-master bus.

FIG. 11 is a block diagram illustrating an exemplary master device adapted for multi-master operation over a single-master bus. The master device 1102 may include a first communication interface/circuit 1106, a second communication interface/circuit 1108, and/or a processing circuit 1104. The first communication interface/circuit 1106 may serve to couple to a single line interrupt request (IRQ) bus to which a plurality of other devices may be coupled. The second communication interface/circuit 1108 may serve to couple to a data bus to which the plurality of other devices may also be coupled.

The processing circuit 1104 may include various sub-circuits and/or modules to carry out one or more functions described herein. For example, a communication management circuit/module 1110 may be adapted to manage communications over the data bus for all devices coupled to the data bus based on interrupt signals asserted over the IRQ bus. An IRQ bus monitoring circuit/module 1112 may be adapted to monitor the IRQ bus to ascertain when an IRQ signal has been asserted. A data bus polling circuit/module 1114 may be adapted to poll the inactive master devices over the data bus to ascertain which inactive master device asserted the IRQ signal on the IRQ bus. A data bus handover circuit/module 1116 may be adapted to hand over control of the data bus to an asserting inactive master device upon obtaining an indication from the inactive master device that it made a master request. In one example, the master request from the inactive master device may be obtained over the first interface. The indication from the inactive master device may be obtained over the second interface. In various examples, the data bus may be a camera control interface extension (CCIe)-compatible bus and/or a bidirectional bus.

In some implementations, the processing circuit may be further adapted to identify the asserting inactive master device with which the IRQ signal is associated based on the obtained indicator. For instance, if the indicator from each inactive master device has a difference pulse width, then this may be sufficient to identify the asserting inactive master.

In other implementations, the processing circuit may be further adapted to identify a group of devices with which the IRQ signal is associated. For instance, each group of devices may include a single device or a plurality of devices. Where a group includes a plurality of devices, the processing circuit may be further adapted to scan the devices for the identified group to ascertain which device asserted the IRQ signal on the IRQ bus. The IRQ signal associated with each group may have a different pulse width than other IRQ signals associated with other groups.

The processing circuit may be further adapted to: (a) ascertain if a polled inactive master device asserted the IRQ signal and made the master request by looking at a particular bit in a status register obtained from each of the polled inactive master devices, and/or (b) send an indicator to the asserting inactive master device over the data bus to transfer control of the data bus.

In-Band Interrupt Mechanism Over Shared Bus

Figure 12:
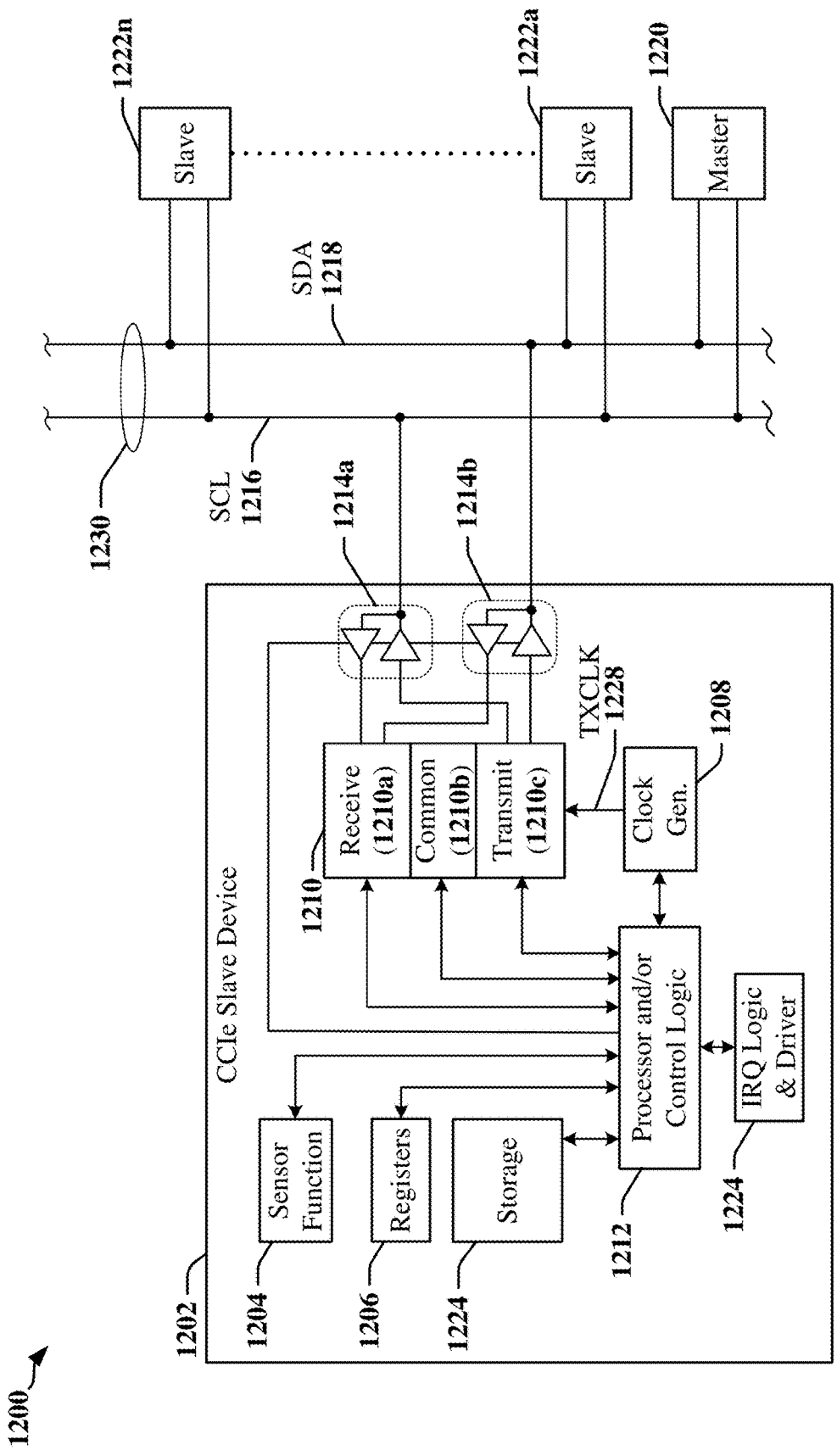
FIG. 12 is a diagram that illustrates a system architecture for an apparatus employing a data link between IC devices according to certain aspects disclosed herein.

FIG. 12 illustrates an example of an apparatus 1200 that employs a two-wire control data bus 1230. The control data bus 1230 may operate in accordance with one or more protocols, including I2C, CCI, CCIe or other protocols. The apparatus 1200 may be embodied in one or more of a wireless mobile device, a mobile telephone, a mobile computing system, a wireless telephone, a notebook computer, a tablet computing device, a media player, a gaming device, or the like. The apparatus 1200 may include multiple devices 1202, 1220, and/or 1222a-1222n, which communicate using the control data bus 1230. The control data bus 1230 can extend the capabilities of a conventional I2C bus for devices that are configured for enhanced features that can be supported by the control data bus 1230. For example, the control data bus 1230 may support a protocol that operates at a higher bit rate than an I2C bus 1230. According to certain aspects disclosed herein, some versions of the control data bus 1230 may be configured or adapted to support bit rates of 16.7 megabits per second or more, and some versions of the control data bus 1230 may be configured or adapted to support data rates of at least 23 megabits per second.

In one example, the apparatus 1200 includes an imaging device 1202, which may be configured to operate as a slave on the control data bus 1230. The imaging device 1202 may be adapted to provide a sensor control function 1204 that manages an image sensor, for example. In addition, the imaging device 1202 may include configuration registers 1206 and/or other storage devices 1224, a processing circuit and/or control logic 1212, a transceiver 1210 and line drivers/receivers 1214a and 1214b. The processing circuit and/or control logic 1212 may include a processor such as a state machine, sequencer, signal processor or general-purpose processor. The transceiver 1210 may include a receiver 1210a, a transmitter 1210c and certain common circuits 1210b, including timing, logic and storage circuits and/or devices. In some instances, the transceiver 1210 may include encoders and decoders, clock and data recovery circuits, and the like.

A transmit clock (TXCLK) signal 1228 may be provided to the transmitter 1210c, where the TXCLK signal 1228 can be used to determine data transmission rates over the control data bus 1230. The TXCLK signal 1228 may be transmitted on SCL 1216 in an I2C mode of operation, and in certain other modes of operation. In some instances, the TXCLK signal 1228 may be embedded within sequences of symbols transmitted on the control data bus 1230, when both SDA 1218 and SCL 1216 are used to encode transmitted data. In one example, the TXCLK signal 1228 may be embedded using transition clock transcoding, whereby data to be transmitted over the physical link is transcoded such that a change of signaling state of at least one wire (SCL 1216 or SDA 1218) occurs between each pair of consecutive symbols transmitted on the control data bus 1230.

The devices 1202, 1220, and/or 1222a-1222n may communicate using the two wires 1216, 1218 of the control data bus 1230 using any suitable communication protocol. For example, the two-wire control data bus 1230 may support CCIe bi-directional, half-duplex modes of communication that can provide significantly greater data rates than the data rates supported by I2C or CCI modes of operation. In CCIe mode, certain of the devices 1202, 1220, and/or 1222a-1222n may transmit data on both SCL 1216 and SDA 1218 of the control data bus 1230, with clock information embedded in a sequence of symbols transmitted on the two-wire control data bus 1230. One or more devices 1220 may be configured as a bus master, and one or more devices 1202, and/or 1222a-1222n may be configured as slave devices. The devices 1202, 1220, and/or 1222a-1222n may be compatible with, or coexist with devices coupled to the control data bus 1230 while that communicating using I2C, CCI and/or CCIe protocols. For example, a device 1202, 1220, or 1222a-1222n may communicate with one or more other devices 1202, 1220, and/or 1222a-1222n using CCIe protocols and signaling specifications, even when I2C-limited devices are monitoring the control data bus 1230. One example disclosed herein provides an interface that can handle multiple slaves 1202, and/or 1222a-1222n coupled to the control data bus 1230, with a single master device 1220, when I2C, CCI, and/or CCIe devices are deployed on the same bus. In the latter example, two or more devices 1202, 1220, and/or 1222a-1222n may communicate using CCIe protocols, and any communication transaction with another device 1202, 1220, and/or 1222a-1222n that supports only I2C or CCI protocols can be conducted in accordance with I2C bus protocols.

Figure 13:
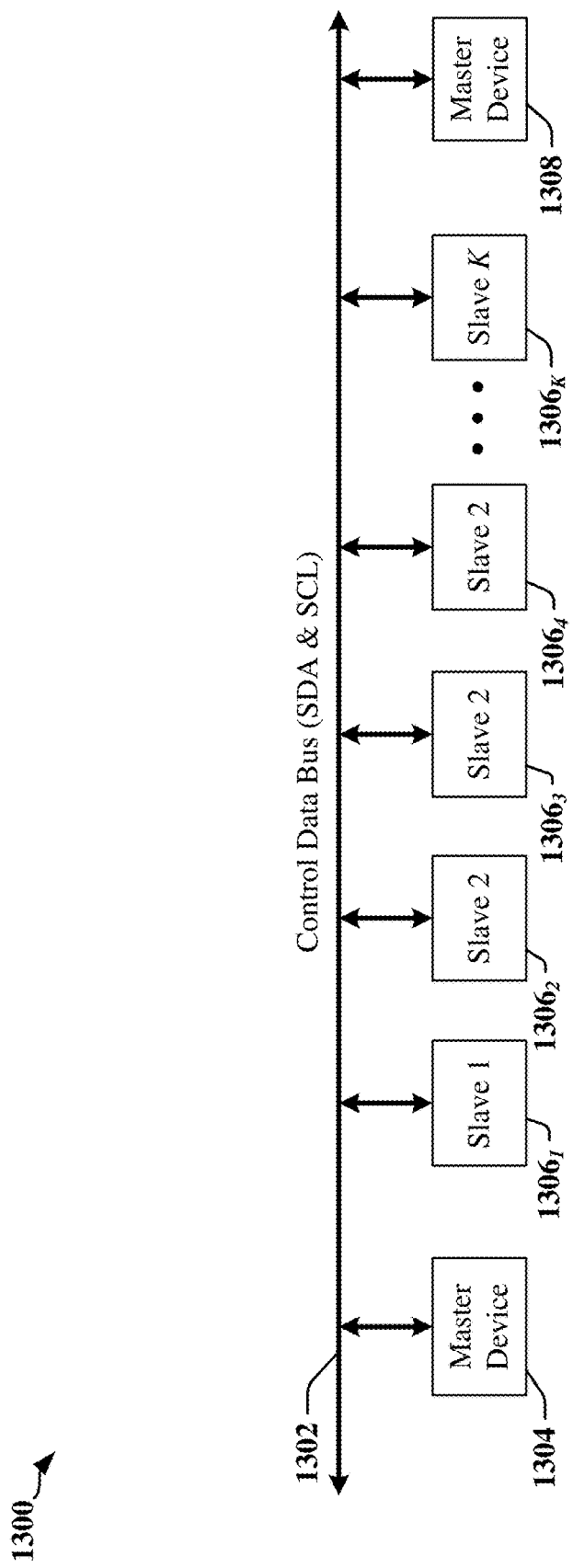
FIG. 13 is a block diagram illustrating a plurality of slave devices that may be configured for in-band interrupt according to certain aspects disclosed herein.

FIG. 13 is a block diagram illustrating a system 1300 in which the interrupt bus has been eliminated in favor of in-band interrupts. The system 1300 may include one or more master devices 1304, 1308 and a plurality of slave devices $1306_1$-$1306_K$ coupled to a shared control data bus 1302. In one example, the control data bus 1302 may be operated as an I2C bus comprising two wires, SCL 1216 and SDA 1218 (see FIG. 12). The SCL 1216 may be used to synchronize all data transfers over the control data bus 1302. The SDA 1218 and SCL 1216 are coupled to all devices 1304, $1306_1$-$1306_K$ and 1308 on the control data bus 1302. In this example, interrupts are asserted in-band over the control data bus 1302. In some instances, the control data bus 1302 may support both I2C devices and CCIe devices concurrently.

Figure 14:
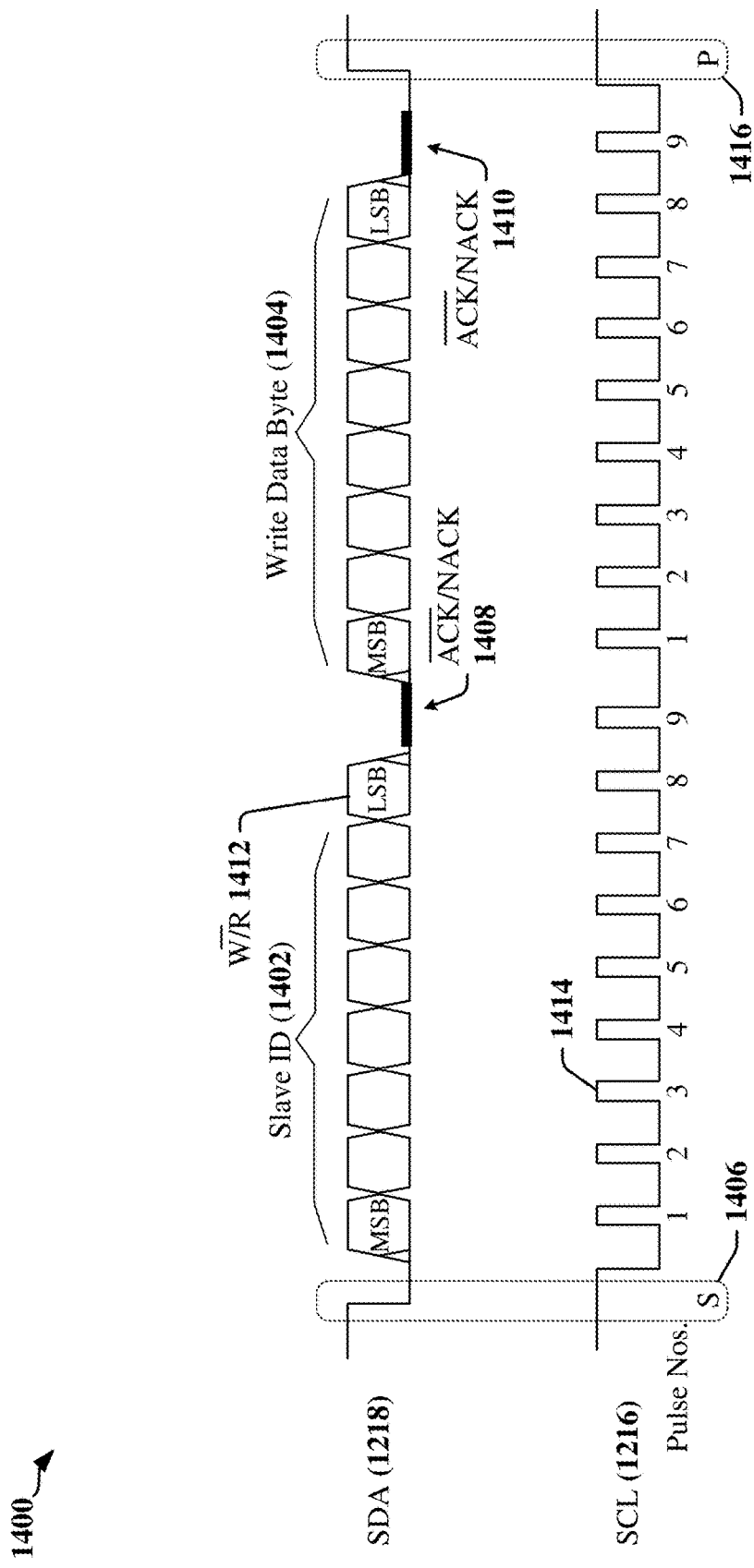
FIG. 14 is a timing diagram illustrating an I2C one-byte write data operation.

FIG. 14 is a timing diagram 1400 illustrating an example of single-byte write data operation when a serial bus, such as the control data bus 1302 of FIG. 13, is operated in accordance with I2C protocols. Each I2C transmission commences with a start condition 1406 that is asserted on the serial bus, and terminates when a stop condition 1416 is asserted on the serial bus. The start condition 1406 is asserted when SDA 1218 transitions low while SCL 1216 is held in a high state. The stop condition 1416 is asserted when SDA 1218 transitions high while the SCL 1216 is held in a high state. According to I2C protocols, transitions on SDA 1218 occur when SCL 1216 is low, except for start condition 1406 and stop conditions 1416.

In typical I2C operations, an I2C master node sends a 7-bit slave ID 1402 on SDA 1218 to indicate which slave node on the I2C bus the master node wishes to access, followed by a Read/Write bit 1412 that indicates whether the operation is a read or a write operation, whereby the Read/Write bit 1412 is at logic 0 to indicate a write operation and at logic 1 to indicate a read operation. Only the slave node whose ID matches with the 7-bit slave ID 1402 is permitted respond to the write (or any other) operation. In order for an I2C slave node to detect its own slave ID 1402, the master node transmits at least 8-bits on SDA 1218, together with 8 clock pulses on SCL 1216. This behavior may be exploited to transmit data in CCIe operating modes in order to prevent legacy I2C slave nodes from reacting to CCIe operations.

An active master device 1304/1308 controls access to the control data bus 1302. Any device that wishes to transmit over the control data bus 1302 is required to request a grant of access to the control data bus 1302 from the active master device 1304, 1306. Such request may be made by issuing an interrupt request. In one example, a slave device 1306₁-1306$_K$ may issue an interrupt request through an in-band interrupt mechanism that occurs according to predefined timing. An inactive master device 1308/1304 may issue an interrupt request in an attempt to acquire control of the control data bus 1302 from the active master device 1304/1308. The use of an in-band interrupt mechanism can prevent bus contention and/or collisions. Collisions may be avoided when an interrupt mechanism prevents slave devices 1306₁-1306$_K$ from driving either SDA 1218 or SCL 1216 while the active master device 1304/1308 is driving the control data bus 1302.

Figure 15:
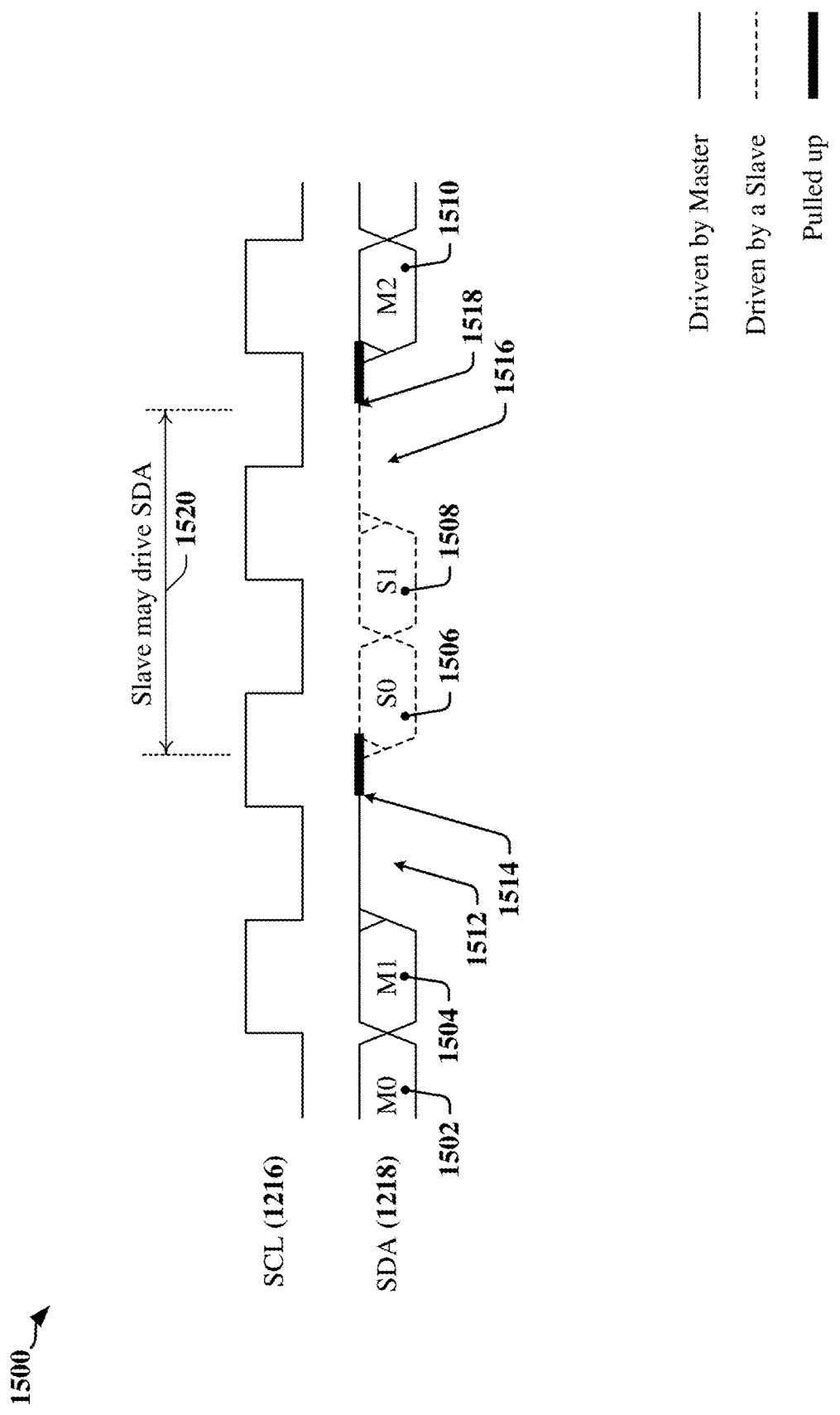
FIG. 15 is a timing diagram illustrating a technique for avoiding bus contention and/or collisions when an in-band interrupt mechanism is used.

FIG. 15 is a timing diagram 1500 that illustrates a solution that may be employed to avoid the potential for bus contention and/or collisions when an in-band interrupt mechanism is used. In this approach, a protocol governing communication over the control data bus 1302 bus defines when an in-band IRQ may be issued. In one example, the active master device 1304/1308 may provide a clock on SCL 1216 during a defined period of time 1520 when a slave device 1306₁-1306$_K$ or inactive master device 1308/1304 is permitted to drive SDA 1218. In operation, the active master device 1304/1308 may drive SDA 1218 high and enable a pull-up circuit that maintains the high state after transmissions 1502, 1504 on SDA 1218. SDA 1218 may be released at some point 1514, after which a responding device 1306₁-1306$_K$, 1308/1304 may drive SDA 1218 during one or more clock periods 1506, 1508. After the one or more clock periods 1506, 1508 have expired, the responding device 1306₁-1306$_K$, 1308/1304 may then drive SDA 1218 high 1516 before releasing SDA 1218 at some point in time 1518. The active master device 1304/1308 may then begin transmitting 1510 on SDA 1218.

Figure 16:
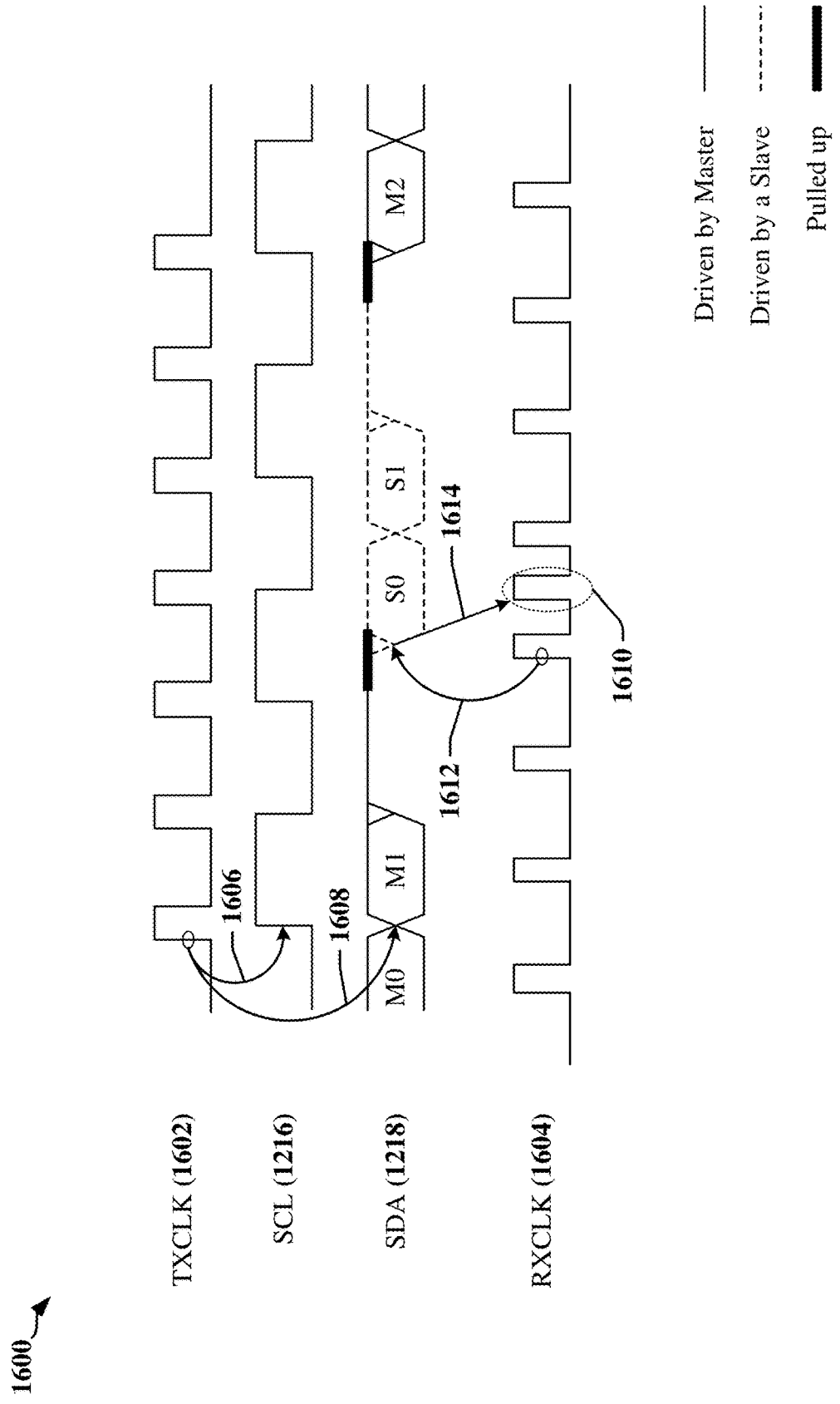
FIG. 16 is a timing diagram illustrating the potential occurrence of an additional or erroneous clock pulse when in-band IRQ is used.

As illustrated in the timing diagram 1600 of FIG. 16, an in-band IRQ asserted by a slave device 1306₁-1306$_K$ or inactive master device 1308/1304 on SDA 1218 may cause an erroneous, extra clock pulse 1610 to be detected. In an example in which the control data bus 1302 is operated in a CCIe mode, symbol transitions are used to generate a receiver clock (RXCLX) signal 1604. All receiving devices recover clock timing from state transitions of the control data bus 1302. The state transitions correspond to signaling state changes on SDA 1218 and/or SCL 1216, and the state transition may be timing-aligned between SDA 1218 and SCL 1216. A clock data recovery (CDR) circuit may tolerate some skew between SDA 1218 and SCL 1216, although skew larger than the tolerance of the CDR can cause the CDR to generate the extra receiver clock pulse 1610 resulting a synchronization loss at a word boundary.

Figure 17:
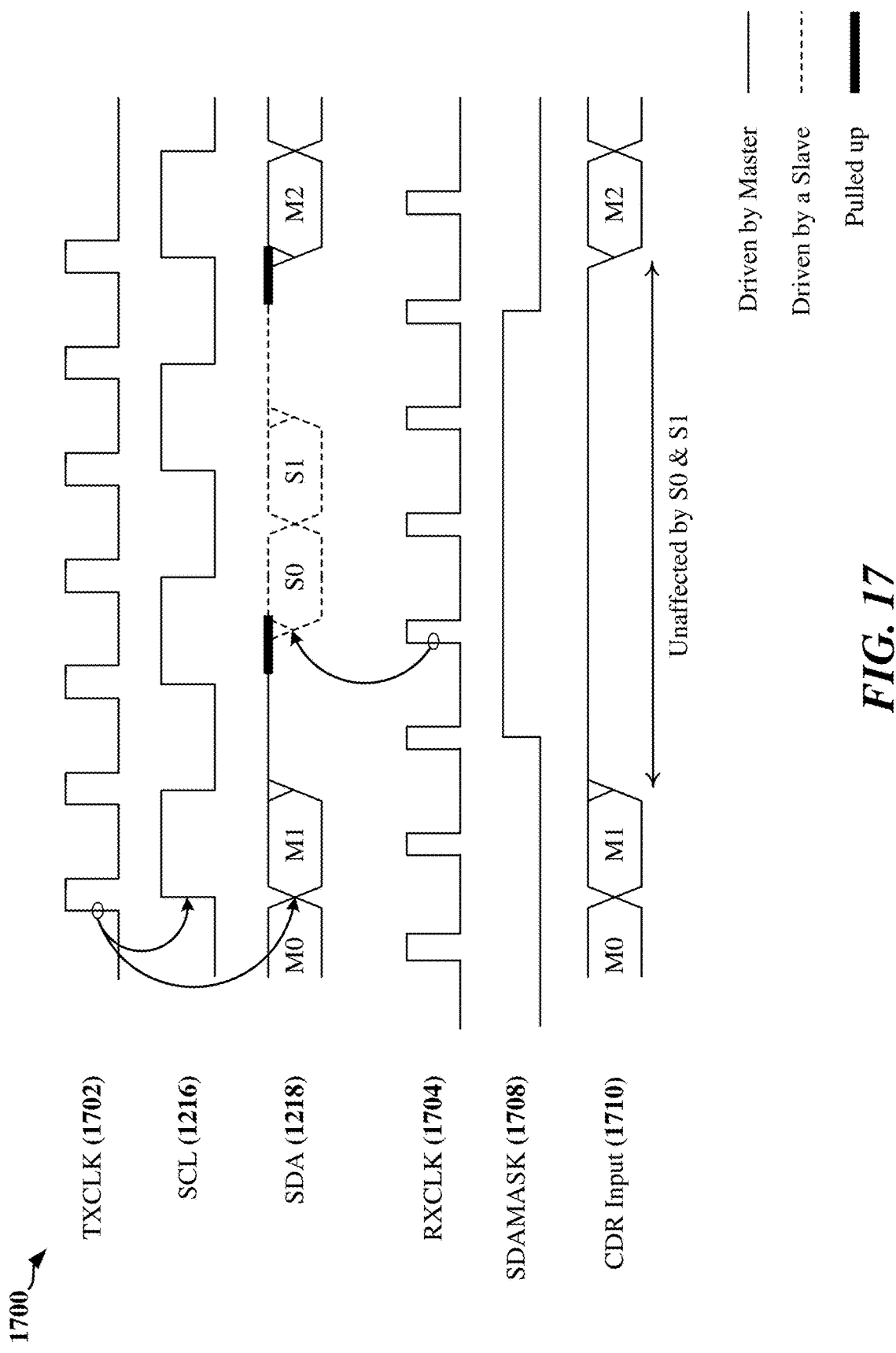
FIG. 17 is a timing diagram illustrating the suppression of additional or erroneous clock pulses according to certain aspects disclosed herein.

FIG. 17 is a timing diagram 1700 that illustrates one solution that may avoid the generation of the extra pulse 1610 on the RXCLK signal 1604 and potential synchronization loss. An SDA masking (SDAMASK) signal 1708 gates or masks the signal that is used for in-band IRQ at the clock data recovery circuit input by each device, including the master devices 1304, 1308 and the slave devices 1306₁-1306$_K$. For instance, each CDR circuit masks SDA 1218 or SCL 1216 (whichever line is used for in-band IRQ) during in-band IRQ transmissions. If, for example, an active master device 1304/1308 permits a slave device 1306₁-1306$_K$ or inactive master device 1308/1304 to drive SDA 1218 with an appropriate in-band IRQ protocol, all devices on the control data bus 1302 are required to mask their SDA 1218 input during the period available for driving by the driving device 1306₁-1306$_K$, 1308/1304 in order to prevent erroneous/extra RXCLK pulses from being detected. In one example, each device 1306₁-1306$_K$, 1308/1304 gates SDA 1218 such that the input (CDR Input 1710) to the CDR circuit is held at at logic 1 (or high) during the in-band IRQ period.

Figure 18:
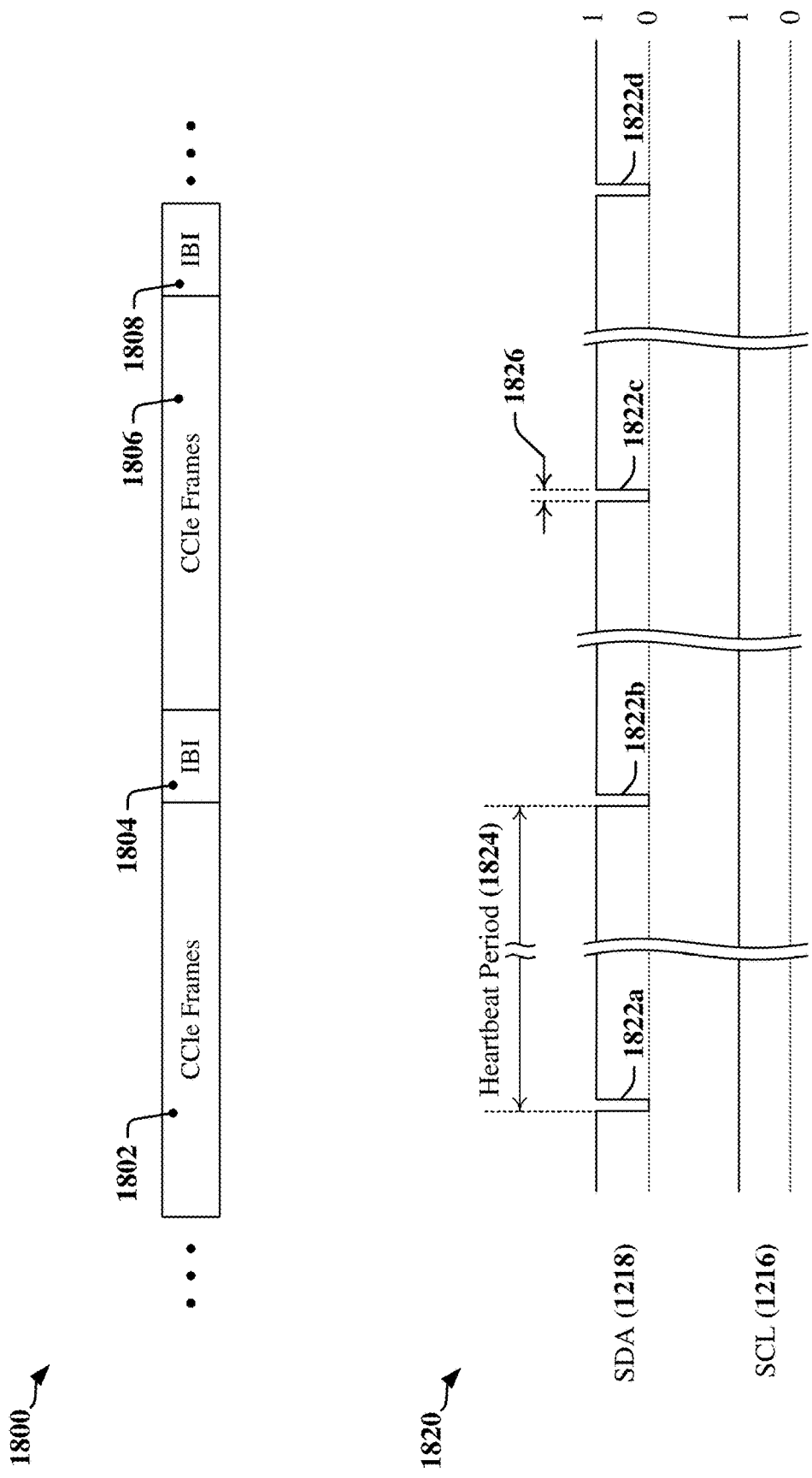
FIG. 18 illustrates a heartbeat clock that may be used to provide in-band interrupt opportunities in accordance with certain aspects disclosed herein.

FIG. 18 illustrates a heartbeat clock that may be used to provide in-band interrupt opportunities in accordance with certain aspects disclosed herein. A first diagram 1800 illustrates an example in which an in-band IRQ (IBI 1804, 1808) may be issued between frames 1802, 1806 while the control data bus 1302 is operated in a non-I2C mode of operation. In this example, the control data bus 1302 is operated in a CCIe mode and a compact in-band IRQ protocol may be implemented using one or two CCIe words such that in-band IRQs can be issued frequently with a minimum protocol overhead. In one example, a periodic IRQ window may be defined.

Among other considerations, the in-band IRQ period may be available even when the bus system is in low-power mode to prevent "starvation" at the slave devices 1306₁-1306$_K$. In one aspect, an in-band IRQ opportunity may be defined within a CCIe "heartbeat" word which is periodically transmitted by the active master device 1304/1308 over the bus to allow synchronization of the slave devices 1306₁-1306$_K$. The active master device 1304/1308 may send this "heartbeat" CCIe word at a rate that is slow enough to enable power conservation, while fast enough to prevent starvation of the slave devices 1306₁-1306$_K$. This "heartbeat" CCIe word may serve as an indicator to slave devices that they may issue IRQs.

FIG. 18 includes a timing diagram that illustrates a heartbeat clock 1820 having heartbeat pulses 1822a, 1822b, 1822c, 1822d. A CCIe control word that is defined according to certain aspects disclosed herein may be used to provide the heartbeat clock 1820. The heartbeat clock 1820 may provide pulses 1822a, 1822b, 1822c, 1822d that have relatively short duration 1826 and that are separated by relatively large periods of time 1824. In one example, the pulses 1822a, 1822b, 1822c, 1822d may be defined as a one-symbol duration (e.g., 50 ns), and the pulses may be separated by 30 microseconds (30 μs), thereby providing a heartbeat clock with a frequency of 32.768 kHz. In this example, CCIe slave devices may use the 32.768 kHz clock extracted from heartbeat words for various standby operations.

Figure 19:
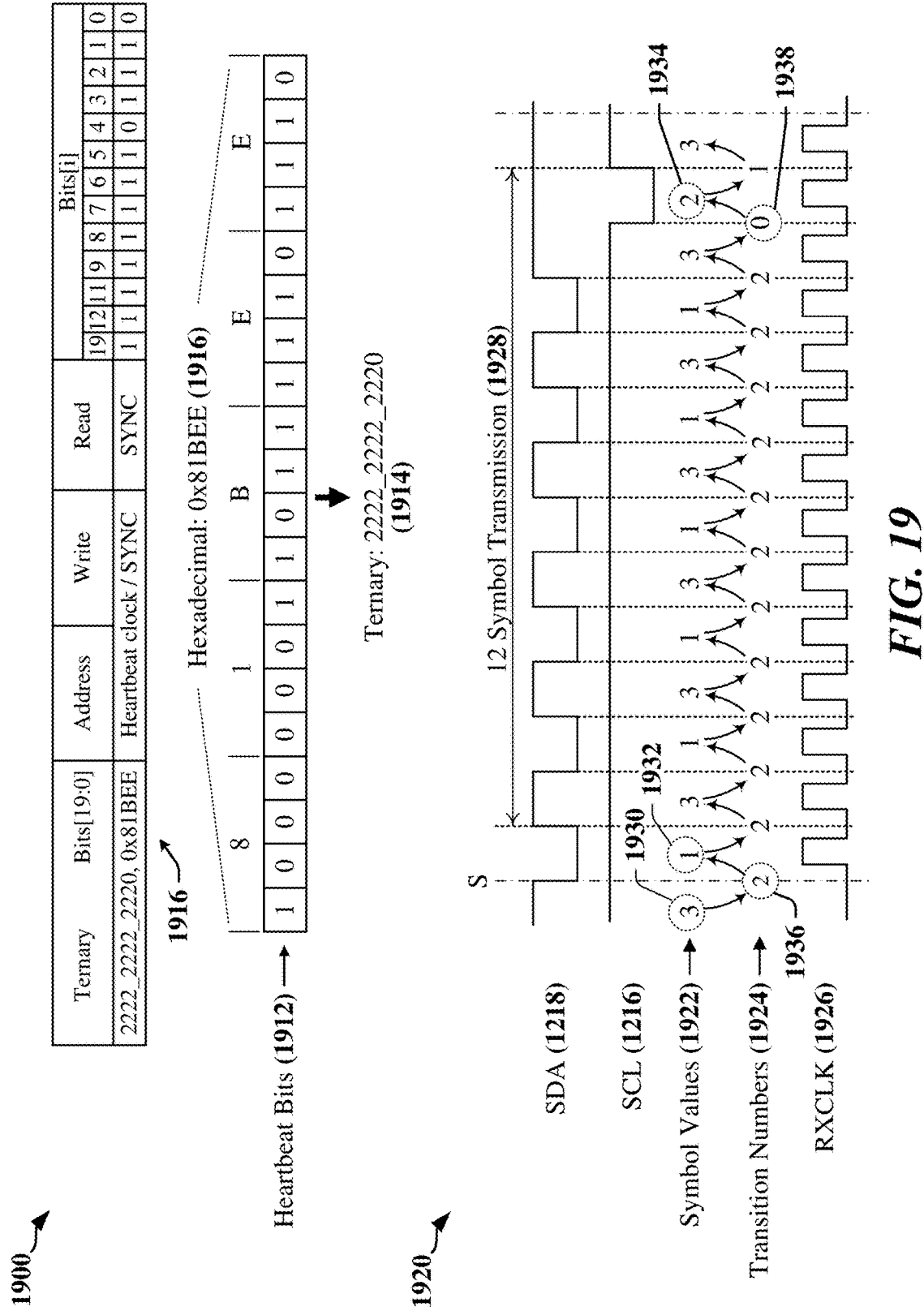
FIG. 19 illustrates an example of a control word that may be transmitted to provide a heartbeat clock according to certain aspects disclosed herein.

FIG. 19 illustrates an example 1900 of a control word 1916 that may be transmitted in compliance with CCIe protocols, and in a manner that enables the CCIe devices to obtain a heartbeat clock, including the heartbeat clock 1820 illustrated in FIG. 18. In one example, the control word 1916 may be expressed as the hexadecimal number 0x81 BEE, which produces a bit pattern 1912 that is mapped to a transition number that may be expressed as a 12-digit ternary number 1914. The transition number that may be encapsulated with start condition values to produce a set of 14 transition numbers 1924 calculated to produce a 12-symbol sequence 1928 that is provided in a stream of symbols 1922. As illustrated in the timing diagram 1920, every other symbol 1930 of the 12-symbol sequence 1928 has a value of '3' which results in a high voltage level on both SDA 1218 and SCL 1216. In the example, currents flowing through pull-up resistors coupled to SDA 1218 and SCL 1216 can be reduced when both SDA 1218 and SCL 1216 are in the high state. For example, a symbol value of '3' may minimize power consumption associated with the serial bus 330. The 12-symbol sequence 1922 also includes symbols 1932, 1934 that have the value '1' or '2,' which cause either SDA 1218 or SCL 1216 to be driven low, while the other of SDA 1218 or SCL 1216 remains high. In each 12-symbol transmission 1928, one symbol 1934 may be provided with a value of '2,' while the remaining symbols have a value of '1' (e.g., symbol 1932) or a value of '3' (e.g., symbol 1930). As a result, the heartbeat control word 1916 produces 6 pulses on SDA 1218 and one pulse on SCL 1216 each time the control word 1916 is transmitted. In one example, a 1.43 MHz clock may be provided on SCL 1216 by repetitively transmitting the heartbeat control word 1916.

First Example of an In-Band IRQ Technique

Figure 20:
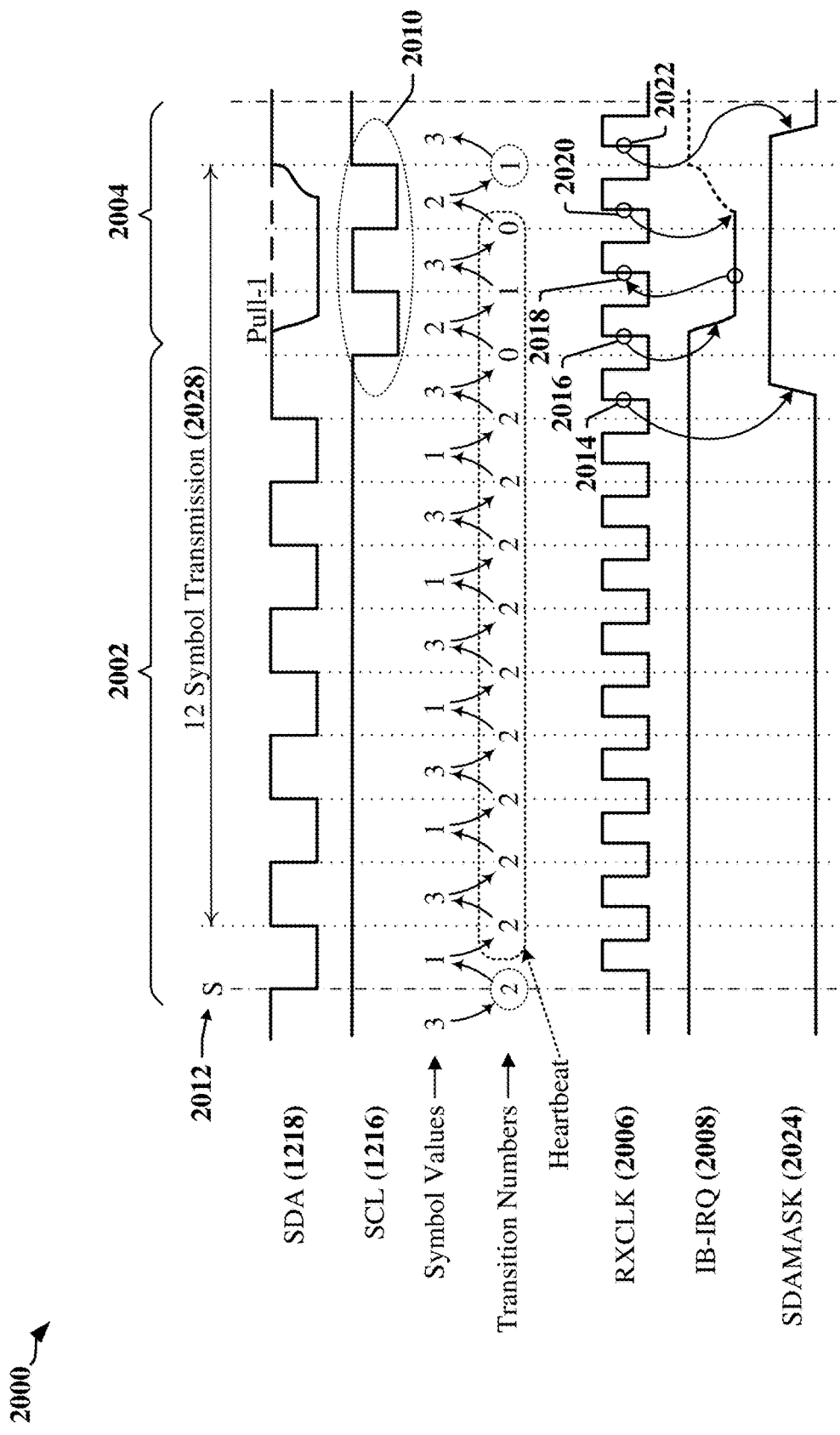
FIG. 20 illustrates a first example in which an in-band IRQ may be asserted during transmission of a heartbeat clock in accordance with certain aspects disclosed herein.

FIG. 20 illustrates an example 2000 in which a heartbeat clock may be transmitted using the SDA 1218 and SCL line 316. In this example, the heartbeat clock includes a first portion 2002 of the heartbeat clock that is transmitted on SDA 1218, while a second portion 2010 of the heartbeat clock may be transmitted on SCL 1216, thereby creating a space or IRQ period 2004 for an in-band interrupt request on SDA 1218.

According to certain aspects, a receiving slave device $1306_1$-$1306_K$ or inactive master device 1308/1304 may detect, for example, the $n^{th}$ RXCLK 2014 after the start S indicator 2012. The $n^{th}$ RXCLK 2014 may trigger an internal SDA mask 2024 within a receiving slave device $1306_1$-$1306_K$ or inactive master device 1308/1304 to internally mask SDA 1218.

At the n+1 RXCLK 2016, a slave device $1306_1$-$1306_K$ or inactive master device 1308/1304 may trigger an IRQ by pulling SDA 1218 low. SDA 1218 may be pulled high by the active master device 1304/1308 or SDA 1218 may float. When SDA 1218 is pulled low by a slave device $1306_1$-$1306_K$ or inactive master device 1308/1304, an in-band IRQ is indicated. At the n+2 RXCLK pulse 2018, the active master device 1304/1308 may sample SDA 1218 to ascertain whether an in-band IRQ has been asserted. At the n+3 RXCLK pulse 2020, the slave device may release SDA 1218, such that the in-band IRQ is de-asserted. Between the n+3 RXCLK pulse 2020 and the n+4 RXCLK pulse 2022, the active master device 1304/1308 re-enables the SDA driver and starts driving SDA 1218 high. Accordingly, a receiving device $1306_1$-$1306_K$, 1308, or 1304 can safely release SDA mask 2824 at the n+4 RXCLK pulse 2022. In this manner, an IRQ may be transmitted by one or more slave devices $1306_1$-$1306_K$ or inactive master devices 1308/1304 during the IRQ period 2004 defined on SDA 1218.

Second Example of an In-Band IRQ Technique

Figure 21:
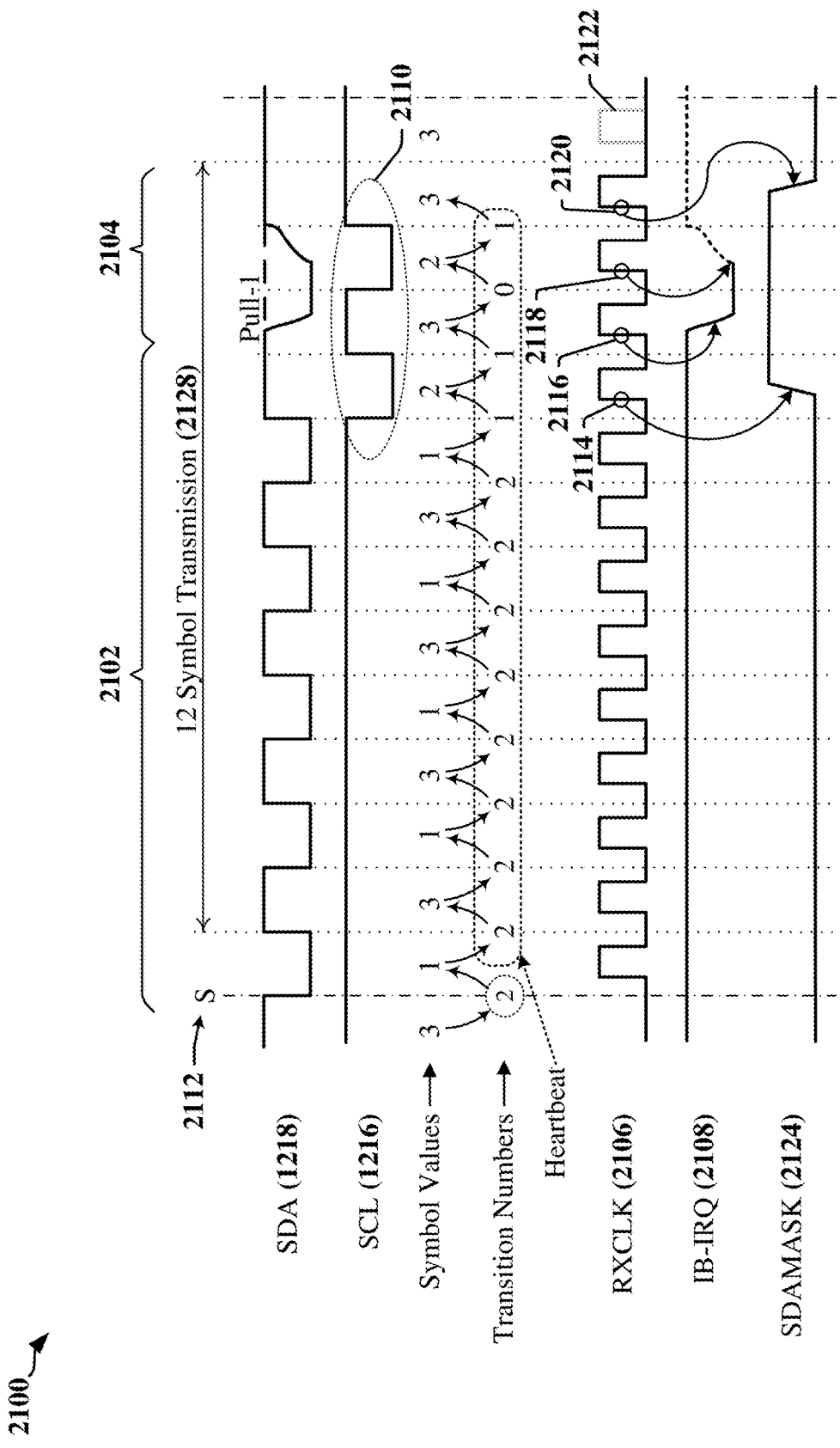
FIG. 21 illustrates a second example in which an in-band IRQ may be asserted during transmission of a heartbeat clock in accordance with certain aspects disclosed herein.

FIG. 21 is a timing diagram 2100 that illustrates a technique for implementing in-band IRQ on a control data bus 1302 in accordance with certain aspects disclosed herein. In the illustrated example, the control data bus 1302 is operated in a CCIe mode, or may be operable in the CCIe mode. In this example, the number of receiver clock RXCLK cycles needed to perform an in-band interrupt request may be reduced with respect to the example described in relation to FIG. 20. The timing diagram 2100 corresponds to a protocol for providing an IRQ period 2104, in which a receiving slave device may detect, for example, the $n^{th}$ RXCLK pulse 2114 after the start S indicator 2112. The $n^{th}$ RXCLK pulse 2114 may trigger an internal SDA mask 2124 to internally mask SDA 1218 within a slave device $1306_1$-$1306_K$ or inactive master device 1308/1304.

At the n+1 RXCLK pulse 2116, the slave device $1306_1$-$1306_K$ or inactive master device 1308/1304 may trigger an IRQ by pulling SDA 1218 low. Before the arrival of the n+1 RXCLK pulse 2116, the active master device 1304/1308 may cause SDA 1218 to be pulled weakly to a high state, using a resistive pull-up or the like. An in-band IRQ may be indicated when a slave device $1306_1$-$1306_K$ or inactive master device 1308/1304 pulls SDA 1218 low.

Rather than waiting until the next clock cycle, between the n+1 RXCLK pulse 2116 and before the n+2 RXCLK pulse 2118, the active master device 1304/1308 may monitor SDA 1218 to ascertain if and/or when SDA 1218 goes low as an indication that an in-band IRQ request has been asserted. It will be appreciated that the active master device 1304/1308 may limit monitoring of SDA 1218 to the duration of the IRQ period. The active master device 1304/1308 may asynchronously detect any IRQ requests from the slave device $1306_1$-$1306_K$ or inactive master device 1308/1304. At the n+2 RXCLK pulse 2118, the slave device $1306_1$-$1306_K$ or inactive master device 1308/1304 may release SDA 1218 in order to de-assert the in-band IRQ. Between the n+2 and n+3 RXCLK pulses, the active master device 1304/1308 may re-enable a driver that provides SDA 1218 and may begin to drive SDA 1218 to a high level. Consequently, a receiver of the asserting slave device $1306_1$-$1306_K$ or inactive master device 1308/1304 can safely release SDA mask 2124 at the n+3 RXCLK pulse 2120. At the n+3 RXCLK pulse 2120, the slave device $1306_1$-$1306_A$ or inactive master device 1308/1304 may release the SDA mask 2124. In this manner, an in-band IRQ may be asserted by a slave device $1306_1$-$1306_K$ or inactive master device 1308/1304 during the IRQ period 2104 defined on SDA 1218.

IRQ Group Inquiry for In-Band IRQ

With continued reference to FIG. 13, each slave device $1306_1$-$1306_K$ and/or inactive master device 1308/1304 coupled to a control data bus 1302 may be uniquely identified by a slave identifier (SID). The active master device 1304/1308 may conduct an inquiry to determine which of the slave devices $1306_1$-$1306_K$ and/or inactive master devices 1308/1304 coupled to the control data bus 1302 generated an in-band interrupt request. When the active master device 1304/1308 senses that an in-band interrupt request has been asserted by a slave device $1306_1$-$1306_K$ or by an inactive master device 1308/1304, the active master device 1304/1308 may transmit a command sequence that cause any of the devices $1306_1$-$1306_K$, 1308/1304 that asserted an in-band interrupt request to respond to the active master device 1304/1308.

Figure 22:
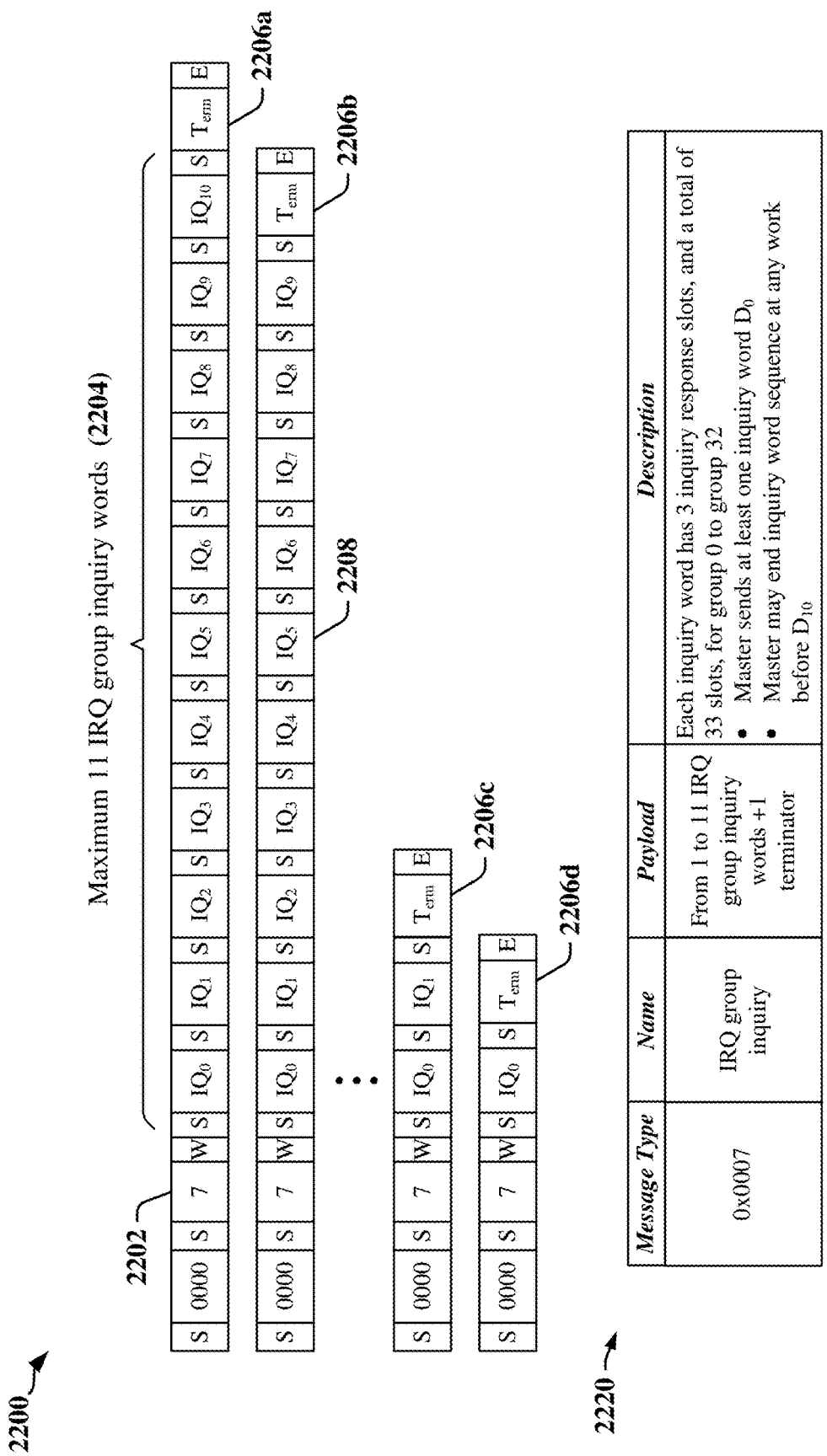
FIG. 22 illustrates an example of a command (interrupt group inquiry call) that may be issued by a master device to determine the source of an interrupt request in accordance with certain aspects disclosed herein.
Figure 23:
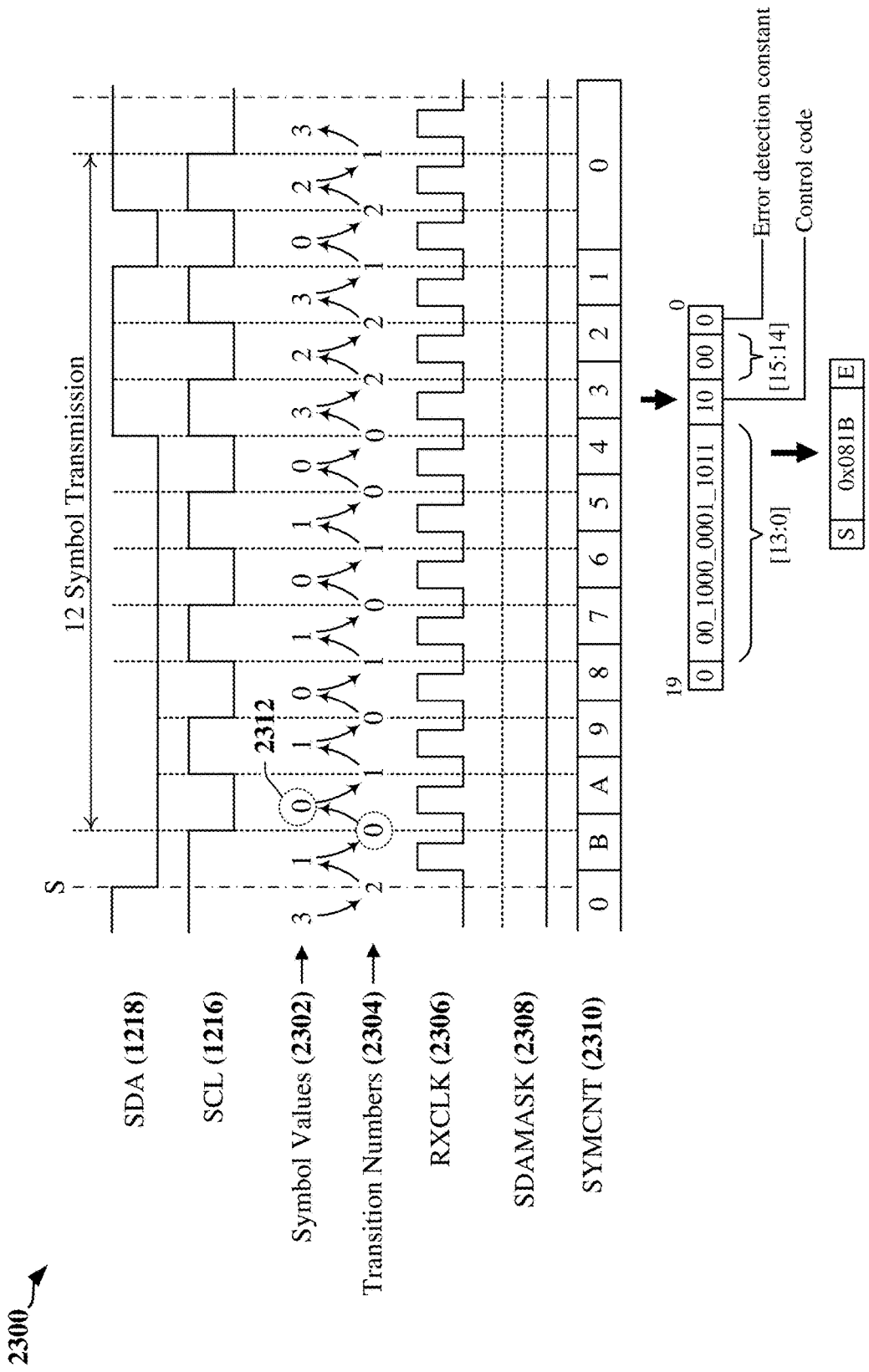
FIG. 23 illustrates one example of a terminator word for the interrupt group inquiry call illustrated in FIG. 22.

FIG. 22 illustrates a command 2200 transmitted in an inquiry that may be conducted by an active master device 1304/1308 to determine the source of an in-band interrupt request in accordance with certain aspects disclosed herein. The command 2200 may include or be referred to as an IRQ group inquiry general call 2220. The active master device 1304/1308 may broadcast the IRQ group inquiry general call 2220 to all slave devices $1306_1$-$1306_K$ and/or inactive master devices 1308/1304 coupled to the shared bus. In one example, the IRQ group inquiry general call 2220 may have a message type (here, defined by the value 0x0007 hex), and may be transmitted with a plurality of IRQ group inquiry words 2204. In one example, each inquiry word 2204 has 3 inquiry response slots, such that a transmission for group 0 to group 32 provides a total of 33 inquiry response slots. In one example, the inquiry words 2204 may include from one (1) to eleven (11) IRQ group inquiry words (e.g. IQs 2208), and one terminator word (Term word 2206) at the end. An example of a terminator word 2300 is illustrated in FIG. 23. For each inquiry word 2204, all slave devices mask SDA 1218 of the control data bus 1302. At each IRQ group inquiry (IQ) word 2208 in the payload of the general call, the receiver of each slave device $1306_1$-$1306_K$ and/or inactive master device 1308/1304 begins masking SDA 1218 at $T_{11}$ RXCLK and releases the mask at a dummy ($T_{-1}$) RXCLK.

In the example depicted in FIG. 22, a receiving device $1306_1$-$1306_K$ and/or 1308/1304 may determine that an IRQ group inquiry is being transmitted when the message type of the call has the corresponding value (here, the value is 0x7). As noted, there may be three time slots in each IQ word of the payload of the general call assigned to three different IRQ groups. In each slot, one or more slave devices $1306_1$-$1306_K$ and/or inactive master devices 1308/1304 in each assigned group can drive the SDA line as an inquiry response to indicate it has issued an IRQ or has an IRQ that has not been serviced. The master devices 1304, 1308 may choose numbers of IRQ group inquiry (IQ) words based on number of IRQ groups associated with the bus.

In some instances, or as needed, the active master device 1304/1308 may send a shorter inquiry word sequence than the sequence length needed to cover all existing groups. In one example, the shorter inquiry word sequence may be sent to shorten inquiry time for frequent and short latency events, and a full inquiry may be performed less frequently to cover all groups on the bus. The sequence of the IRQ group inquiry (IQ) words may conclude with a terminator word (Term).

As illustrated in FIG. 23, the symbol pattern of the terminator word 2300 may be chosen so that each receiving device $1306_1$-$1306_K$ and/or 1308/1304 can recognize the word as a terminator word 2300 (e.g., the Term word 2206), rather than an IRQ group inquiry (IQ) at location $T_{11}$. The receiving devices $1306_1$-$1306_K$ and/or 1308/1304 can know when to stop masking SDA and to terminate the IRQ group inquiry general call processing. The use of the terminator word 2300 scheme permits the length of a payload to be flexibly set, and the length of the IRQ group inquiry (IQ) word sequence can exceed 11 words if necessary.

The IRQ group inquiry call may define bit values for certain words to simplify logic and decision making at the receiving device $1306_1$-$1306_K$ and/or 1308/1304 related to variable length transmissions and the activation of an SDAMASK signal 2308, 2408. In one example, the difference between the response word and certain other words associated with general calls may be observed in differences between the initial symbol of the response word and the initial symbol 2312 of the Term word 2206 (see also FIG. 23). That is, differences that are apparent between the first (most significant) symbols of the corresponding transmitted sequences of symbols 2302 may be used by receiving devices $1306_1$-$1306_K$ and/or 1308/1304 to rapidly determine the disposition of the SDAMASK signal 2308, 2408 before decoding of the whole word is completed. In particular, the receiving devices $1306_1$-$1306_K$ and/or 1308/1304 can detect a START condition as the symbol values {3, 1} in received sequences of symbols 2302. Upon detecting the START condition, each receiving device $1306_1$-$1306_K$ and/or 1308/1304 may initialize a symbol counter (SYMCNT 2310) that can be used to track the number of symbols received by the receiving device $1306_1$-$1306_K$ and/or 1308/1304. In one example, SYMCNT 2310 may be initialized with a value of 0xB, and SYMCNT 2310 may be decremented for each symbol received. Accordingly, the receiving devices $1306_1$-$1306_K$ and/or 1308/1304 may determine the state of SDAMASK signal 2308, 2408, 2324 based on the value of the symbol 2312 received when SYMCNT 2310 has a value of 0xB. When the response word is being received, the symbol has a value of 3 when SYMCNT 2310 has a value of 0xB, indicating that the SDAMASK signal 2308, 2408 is to be enabled. When the Term word 2206 is being received, the symbol 2312 does not have a value of 3 (here, the value is 0) when SYMCNT 2310 has a value of 0xB, indicating that the SDAMASK signal 2308 is to be disabled. The configuration of symbols used to encode the response word and the Term word 2206 enables receiving device $1306_1$-$1306_K$ and/or 1308/1304 devices to terminate response or general call sequences on-the-fly, thereby enabling variable length sequences to be handled.

In some instances, the three slots for the first IRQ group inquiry (IQ) are assigned to Group 0, 1, and 2. Groups with smaller numbers are assigned to earlier response slots. Group 0 may be reserved for hot-plugged devices or for devices that the master has not yet recognized on the bus system. Since at least one IRQ group inquiry (IQ) word must be sent, any hot-plugged device that issued an IRQ can always be recognized.

Figure 24:
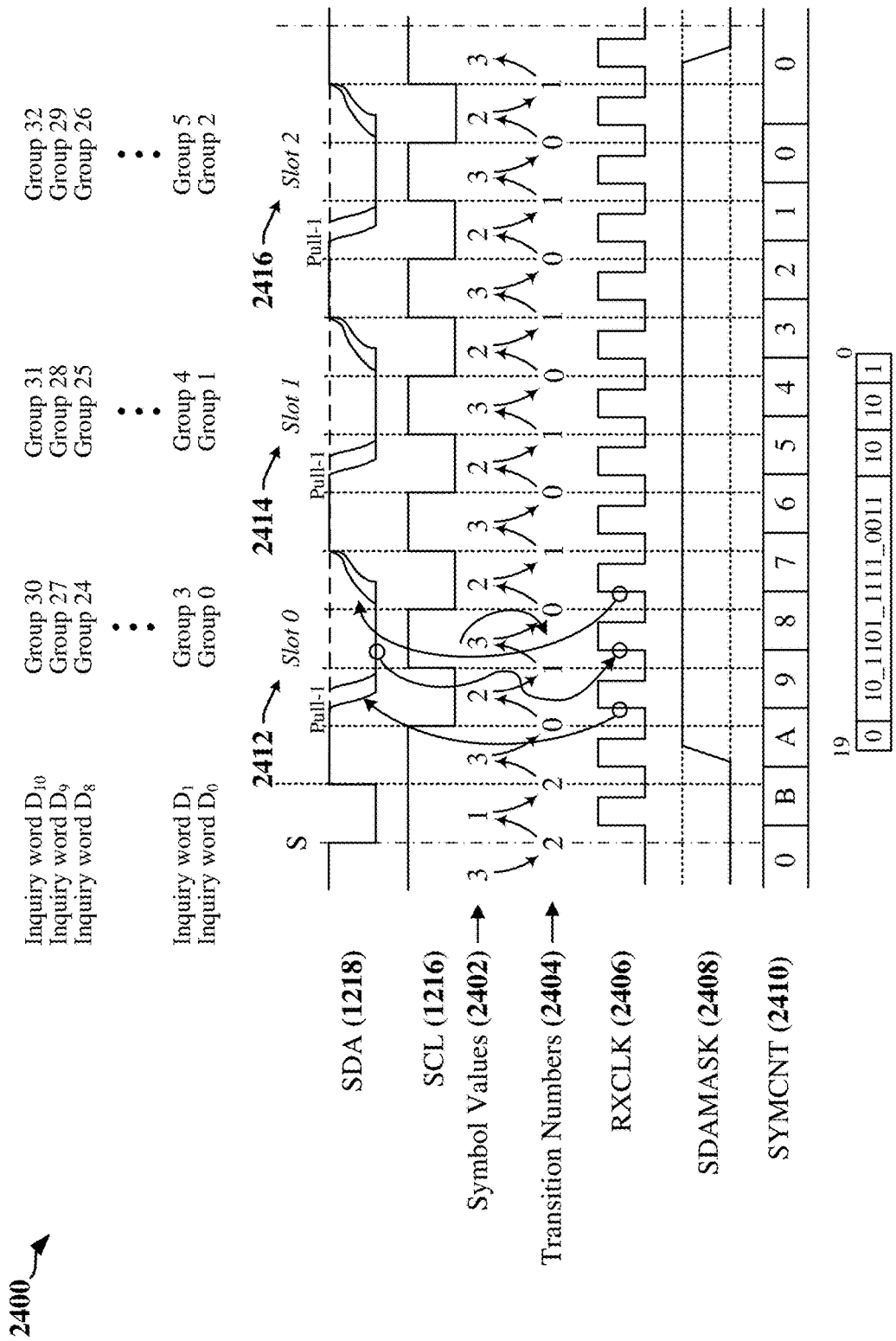
FIG. 24 illustrates an example of the response to a group inquiry call in accordance with certain aspects disclosed herein.

FIG. 24 illustrates an example of a response to a group inquiry call. In this example, one or more response periods (i.e., inquiry words) may be defined on SDA 1218 by transferring clocking to SCL 1216 and using an SDA mask (SDAMASK 2408).

In this example, three separate slots 2412, 2414, and 2416 have been defined for each inquiry (IQ) word 2208 (see FIG. 22). Each of the three time slots 2412, 2414, and 2416 in each IQ word 2208 may be assigned to three different IRQ groups. The slave device $1306_1$-$1306_K$ and/or inactive master device 1308/1304 assigned to each slot 2412, 2414, and 2416 can drive SDA 1218 during the assigned slot 2412, 2414, and 2416 as an inquiry response to indicate it has issued an IRQ or is has an IRQ that has not been serviced. Since each IRQ group inquiry word 2208 has three inquiry response slots 2412, 2414, and 2416, and maximum 11 IRQ group inquiry (IQ) words can be in the general call payload, there can be maximum 33 group slots in one call.

Up to thirty-two (32) devices may be assigned to groups such that only one device is in one group, thereby providing immediate identification of IRQ issuers. This approach identifies multiple IRQ groups at once, thereby reducing the number of IRQ scans necessary (e.g., fewer IRQ nesting). Alternatively, multiple devices may be assigned to each group, but an additional inquiry may be necessary by the active master device 1304/1308 to identify which of the plurality of devices in the group issued the IRQ.

The active master device 1304/1308 may chose the number of IRQ group inquiry (IQ) words to include in a general call based on number of IRQ groups on the bus system. In some examples, the active master device 1304/1308 may send a lesser number of inquiry words 2208 (e.g., less than a maximum number of eleven (11)). This may allow shortening the time for the IRQ group inquiry general call.

The sequence of the IRQ group inquiry (IQ) words ends with a terminator word (i.e., the Term word 2206). The symbol pattern of the Term word 2206 may be chosen so that each slave device $1306_1$-$1306_K$ and/or inactive master device 1308/1304 can recognize the word is a terminator, not an IRQ group inquiry (IQ) at T11 RXCLK to know when to stop masking SDA 1218 and end of the IRQ group inquiry general call.

The three slots 2412, 2414, and 2416 for the first IRQ group inquiry (IQ) may be assigned to Group 0, 1, and 2. A group with smaller number may be assigned to earlier response slots.

In one example, Group 0 may be reserved for hot-plugged devices or devices that the active master device 1304/1308 has not yet recognized on the control data bus 1302. Since at least one IRQ group inquiry (IQ) word must be sent, any hot-plugged device that issued an IRQ is always recognized.

Thanks to the use of the Term word 2206, the length of a general call payload can be flexibly set, and the length of the IRQ group inquiry (IQ) word sequence can exceed 11 words if necessary.

IRQ group inquiry may be used for side-band IRQ, where a separate IRQ signal line may be used by slave devices to request interrupt service. The active master 1304/1308 can identify requesting devices $1306_1$-$1306_K$ and/or 1308/1304 using IRQ group inquiry, and the active master device 1304/1308 need not determine IRQ group by measuring IRQ assertion period with a precise free-running timer. In this respect, the slave devices $1306_1$-$1306_K$ and/or inactive master devices 1308/1304 need not generate IRQs with precise timing and the slave devices $1306_1$-$1306_K$ and/or inactive master devices 1308/1304 need not arbitrate IRQ. Accordingly, slave devices $1306_1$-$1306_K$ and/or master devices 1304, 1308 can operate without a precise free-running timer to create and measure IRQ period for group identification.

According to certain aspects, IRQ group inquiry can support simultaneous IRQ assertions by multiple groups without any group being subjected to arbitration loss. The active master device 1304/1308 can recognize all IRQs at once, and slave devices $1306_1$-$1306_K$ and/or inactive master devices 1308/1304 need not keep repeating IRQs as a result of arbitration loss. Accordingly, the slave devices $1306_1$-$1306_K$ and/or inactive master devices 1308/1304 are less likely to experience access "starvations."

According to certain aspects, an active master device 1304/1308 may voluntarily hand over control of the control data bus 1302 to an inactive master device 1308/1304. The active master device 1304/1308 may have acquired control of the control data bus 1302 in order to perform one or more communication tasks, and may voluntarily yield control of the control data bus 1302 after completing the communication tasks. The communication tasks may involve servicing one or more slave devices $1306_1$-$1306_K$ or inactive master devices 1308/1304. Servicing a slave device $1306_1$-$1306_K$ or inactive master device 1308/1304 may include reading or writing registers or data. The active master device 1304/1308 may indicate its intent to give up control of the control data bus 1302 by transmitting one or more commands to an inactive master device 1308/1304. Indications of intent to voluntarily yield control of the control data bus 1302 may be transmitted when the active master device 1304/1308 initially acquires control of the data bus, when the active master device 1304/1308 has completed its communication tasks, or when the active master device 1304/1308 is nearing completion of its communications tasks. In some instances, the active master device 1304/1308 may indicate that it has yielded control of the control data bus 1302 by transmitting a command to the inactive master device 1308/1304. In some instances, the inactive master device 1308/1304 may refrain from, or defer asserting an interrupt request to obtain control of the control data bus 1302 after the active master device 1304/1308 has indicated its intent to give up the bus.

One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Examples of Certain Aspects of Processing Circuits and their Configuration

Figure 25:
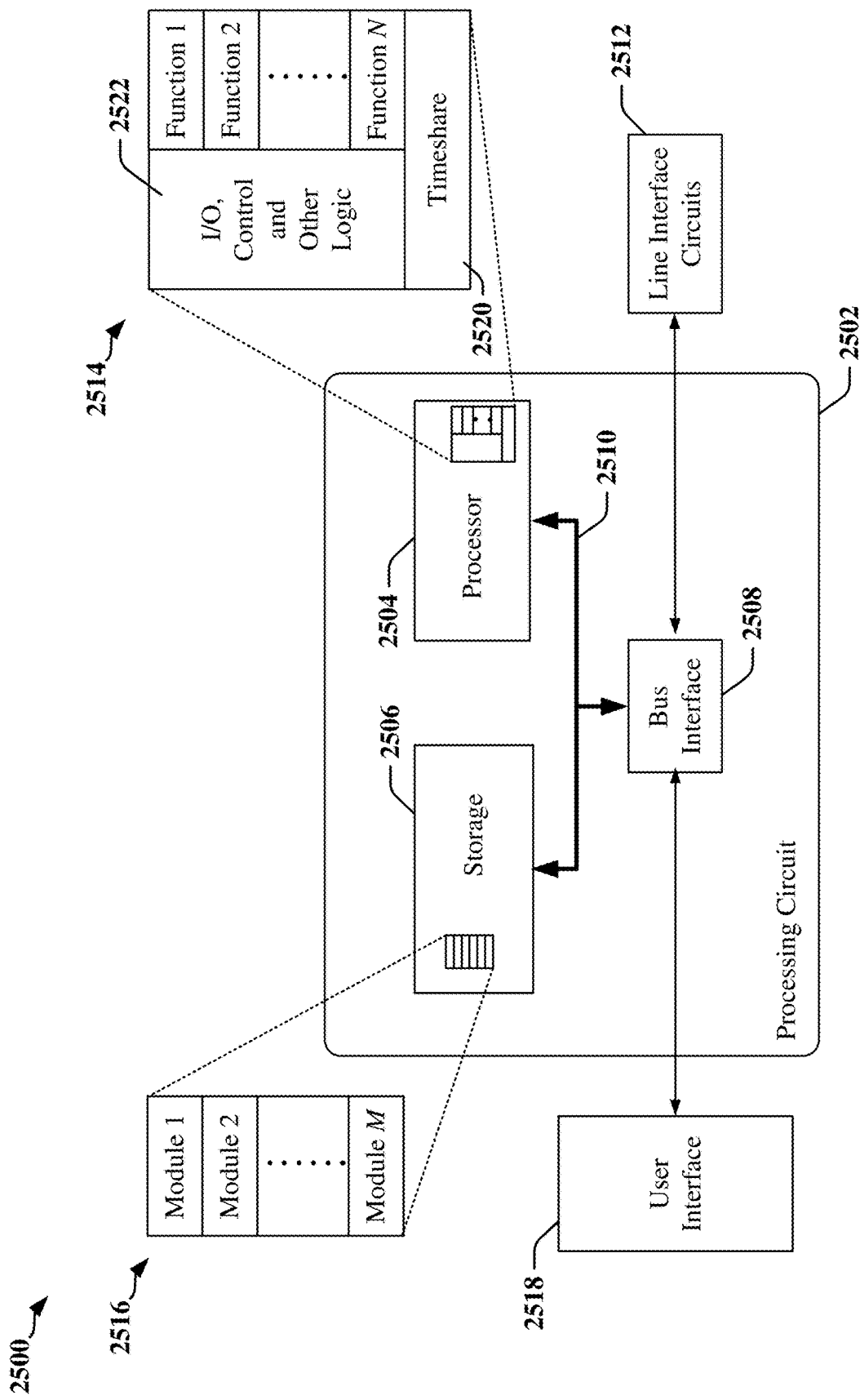
FIG. 25 is a diagram illustrating a first example of a hardware implementation for an apparatus employing a processing circuit adapted according to certain aspects disclosed herein.

FIG. 25 is a conceptual diagram illustrating an example of a hardware implementation for an apparatus 2500 employing a processing circuit 2502 that may be configured to perform one or more functions disclosed herein. In accordance with various aspects of the disclosure, an element, or any portion of an element, or any combination of elements as disclosed herein may be implemented using the processing circuit 2502. The processing circuit 2502 may include one or more processors 2504 that are controlled by some combination of hardware and software modules. Examples of processors 2504 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2504 may include specialized processors that perform specific functions, and that may be configured, augmented or controlled by one of the software modules 2516. The one or more processors 2504 may be configured through a combination of software modules 2516 loaded during initialization, and further configured by loading or unloading one or more software modules 2516 during operation.

In the illustrated example, the processing circuit 2502 may be implemented with a bus architecture, represented generally by the bus 2510. The bus 2510 may include any number of interconnecting buses and bridges depending on the specific application of the processing circuit 2502 and the overall design constraints. The bus 2510 links together various circuits including the one or more processors 2504, and storage 2506. Storage 2506 may include memory devices and mass storage devices, and may be referred to herein as computer-readable media and/or processor-readable media. The bus 2510 may also link various other circuits such as timing sources, timers, peripherals, voltage regulators, and power management circuits. A bus interface 2508 may provide an interface between the bus 2510 and one or more transceivers 2512. A transceiver 2512 may be provided for each networking technology supported by the processing circuit. In some instances, multiple networking technologies may share some or all of the circuitry or processing modules found in a transceiver 2512. Each transceiver 2512 provides a means for communicating with various other apparatus over a transmission medium. Depending upon the nature of the apparatus, a user interface 2518 (e.g., keypad, display, speaker, microphone, joystick) may also be provided, and may be communicatively coupled to the bus 2510 directly or through the bus interface 2508.

A processor 2504 may be responsible for managing the bus 2510 and for general processing that may include the execution of software stored in a computer-readable medium that may include the storage 2506. In this respect, the processing circuit 2502, including the processor 2504, may be used to implement any of the methods, functions and techniques disclosed herein. The storage 2506 may be used for storing data that is manipulated by the processor 2504 when executing software, and the software may be configured to implement any one of the methods disclosed herein.

One or more processors 2504 in the processing circuit 2502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2506 or in an external computer readable medium. The external computer-readable medium and/or storage 2506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 2506 may also include, by way of example, a carrier wave, a transmission line, and any other suitable medium for transmitting software and/or instructions that may be accessed and read by a computer. Computer-readable medium and/or the storage 2506 may reside in the processing circuit 2502, in the processor 2504, external to the processing circuit 2502, or be distributed across multiple entities including the processing circuit 2502. The computer-readable medium and/or storage 2506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2506 may maintain software maintained and/or organized in loadable code segments, modules, applications, programs, etc., which may be referred to herein as software modules 2516. Each of the software modules 2516 may include instructions and data that, when installed or loaded on the processing circuit 2502 and executed by the one or more processors 2504, contribute to a run-time image 2514 that controls the operation of the one or more processors 2504. When executed, certain instructions may cause the processing circuit 2502 to perform functions in accordance with certain methods, algorithms and processes described herein.

Some of the software modules 2516 may be loaded during initialization of the processing circuit 2502, and these software modules 2516 may configure the processing circuit 2502 to enable performance of the various functions disclosed herein. For example, some software modules 2516 may configure internal devices and/or logic circuits 2522 of the processor 2504, and may manage access to external devices such as the transceiver 2512, the bus interface 2508, the user interface 2518, timers, mathematical coprocessors, and so on. The software modules 2516 may include a control program and/or an operating system that interacts with interrupt handlers and device drivers, and that controls access to various resources provided by the processing circuit 2502. The resources may include memory, processing time, access to the transceiver 2512, the user interface 2518, and so on.

One or more processors 2504 of the processing circuit 2502 may be multifunctional, whereby some of the software modules 2516 are loaded and configured to perform different functions or different instances of the same function. The one or more processors 2504 may additionally be adapted to manage background tasks initiated in response to inputs from the user interface 2518, the transceiver 2512, and device drivers, for example. To support the performance of multiple functions, the one or more processors 2504 may be configured to provide a multitasking environment, whereby each of a plurality of functions is implemented as a set of tasks serviced by the one or more processors 2504 as needed or desired. In one example, the multitasking environment may be implemented using a timesharing program 2520 that passes control of a processor 2504 between different tasks, whereby each task returns control of the one or more processors 2504 to the timesharing program 2520 upon completion of any outstanding operations and/or in response to an input such as an interrupt. When a task has control of the one or more processors 2504, the processing circuit is effectively specialized for the purposes addressed by the function associated with the controlling task. The timesharing program 2520 may include an operating system, a main loop that transfers control on a round-robin basis, a function that allocates control of the one or more processors 2504 in accordance with a prioritization of the functions, and/or an interrupt driven main loop that responds to external events by providing control of the one or more processors 2504 to a handling function.

Figure 26:
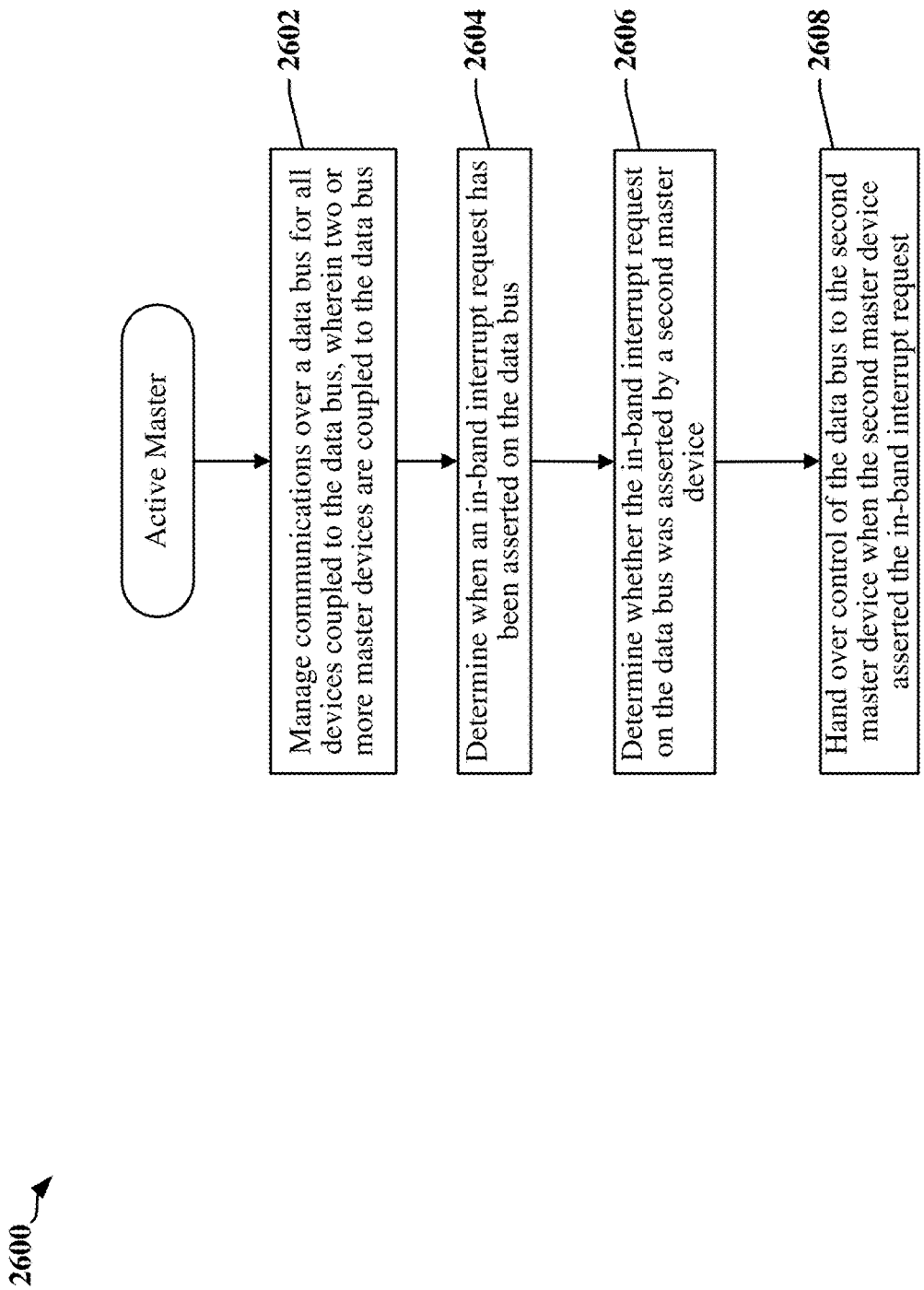
FIG. 26 illustrates a second method for communicating in accordance with one or more aspects disclosed herein.

FIG. 26 is a flowchart 2600 that illustrates certain aspects of a first method related to in-band interrupts on a multi-wire data bus that may be implemented as a shared serial bus. Two or more master devices may be coupled to the data bus. The method may be performed by a first master device coupled to at least a second master device through the data bus. In this example, the first master device may be the active bus master and the second master device may be an inactive bus master. An inactive bus master may behave in the manner of a slave device for at least some bus operations. In some examples the data bus is a two-wire serial bus.

At block 2602, the first master device may manage communications over a data bus for all devices coupled to the data bus.

At block 2604, the first master device may determine when an in-band interrupt request has been asserted on the data bus.

At block 2606, the first master device may determine whether the in-band interrupt request on the data bus was asserted by a second master device.

At block 2608, the first master device may hand over control of the data bus to the second master device after determining that the second master device asserted the in-band interrupt request.

In one example, the first master device may drive a first wire of the data bus to a first signaling state, and then release control of the first wire. The first wire may be initially held in the first signaling state by a pull-up resistor or a pull-down resistor. The first wire may remain in the first signaling state unless or until another device pulls the first wire to a second signaling state. The first master device may determine that an in-band interrupt request on the data bus has been asserted when the first wire is driven to a second signaling state. In one example, the first signaling state corresponds to a logic high and the second signaling state corresponds to a logic low. In another example, the first signaling state and the second signaling state correspond to voltage levels output by a line driver (e.g., ±V, +V and 0 volts, or −V and 0 volts, etc.).

According to certain aspects, the first master device may provide one or more clock pulses on a second wire of the data bus after releasing control of the first wire. The first master device may provide clock pulses on the first wire prior to releasing control of the first wire. In an I2C, CCI, CCIe or I3C bus, for example, the first wire may be the SDA and the second wire may be the SCL. In some configurations, the first wire may be the SCL and the second wire may be the SDA. The first master device may transmit a heartbeat word on the data bus, where the heartbeat word provides clock information. In some instances, the heartbeat word may be transmitted when the bus is operated in an idle or inactive mode. For example, the first master device may have no data to transmit or scheduled communication tasks to perform when the bus is placed in an idle or inactive mode. The clock information provided by the transmission of the heartbeat word may enable a receiver to generate a reduced-frequency clock signal that has a lower frequency than a transmit clock used to control active data transmissions on the bus.

Interrupt opportunities may be available when control of the first wire is released by the first master device. Control of the first wire may be released during transmission of the heartbeat word. In one example, control of the first wire is released during transmission of a portion of the heartbeat word. In some instances, control of the first wire may be released when the data bus is idle, or when the data bus is an inactive mode of operation.

According to certain aspects, the first master device may transmit one or more commands to cause a plurality of devices coupled to the data bus to provide their corresponding device identifiers after determining that the in-band interrupt request has been asserted. The first master device may identify a highest priority device requesting interrupt service based on the device identifiers.

According to certain aspects, the first master device may hand over control of the data bus to the second master device by transmitting a command or sequence of commands to the second master device. The first master device may determine when control should be handed over to the second master device.

Figure 27:
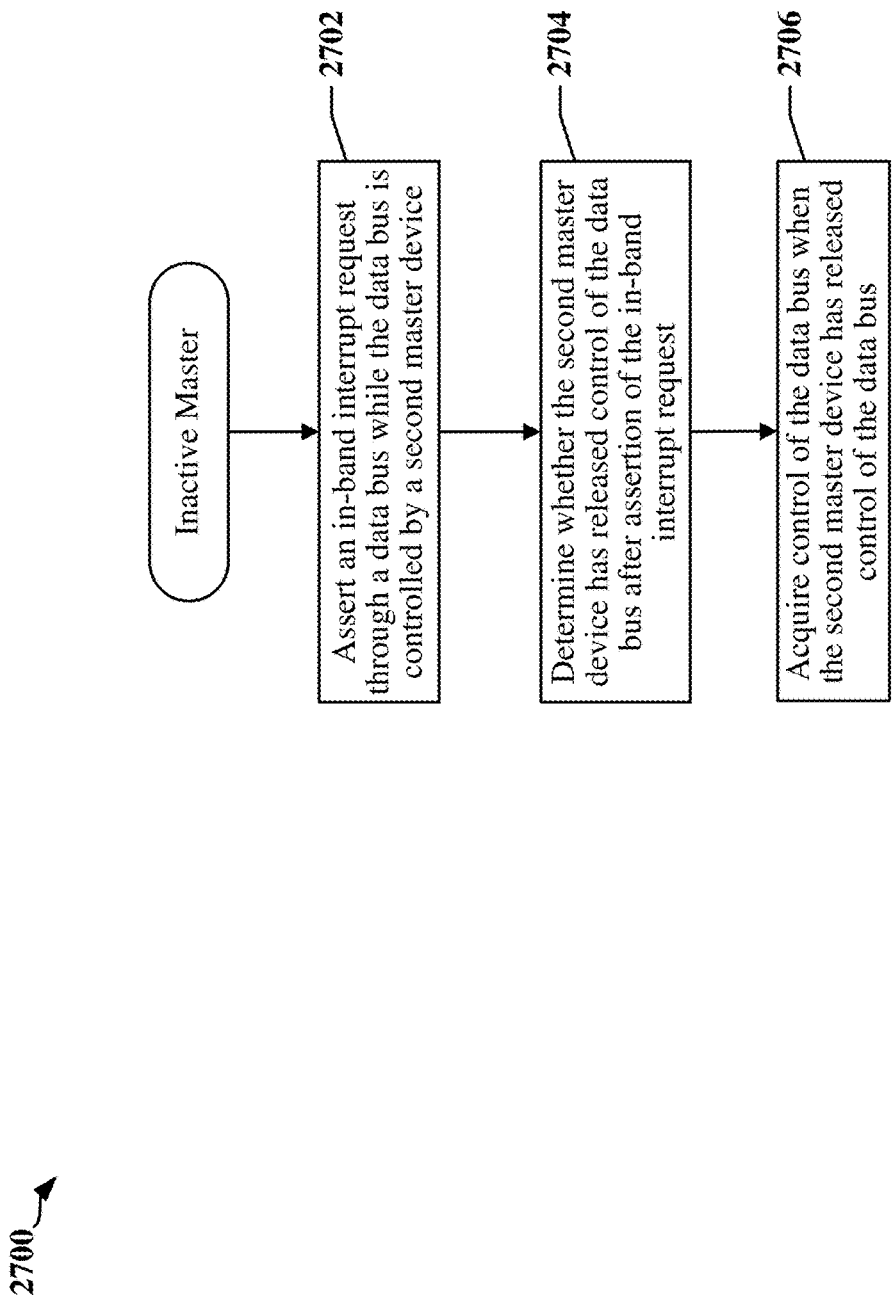
FIG. 27 illustrates a third method for communicating in accordance with one or more aspects disclosed herein.

FIG. 27 is a flowchart 2700 that illustrates certain aspects of a second method related to in-band interrupts on a multi-wire data bus that may be implemented as a shared serial bus. Two or more master devices may be coupled to the data bus. The method may be performed by a first master device coupled to at least a second master device through the data bus. In this example, the first master device may be an inactive bus master and the second master device may be the active bus master. An inactive bus master may behave in the manner of a slave device for at least some bus operations. In some examples the data bus is a two-wire serial bus.

At block 2702, the first master device may assert an in-band interrupt request through the data bus while the data bus is controlled by a second master device. The first master device may drive a first line of the data bus to a first logic level for a first period of time. In one example, the first period of time occurs between data transmissions on the data bus.

At block 2704, the first master device may determine whether the second master device has released control of the data bus after assertion of the in-band interrupt request. Control of the first line may be released when the data bus is in an idle or inactive mode of operation.

At block 2706, the first master device may acquire control of the data bus when the second master device has released control of the data bus.

According to certain aspects, the first master device may determine when a period of time when the second master device is receptive to in-band interrupt requests has commenced. The first master device may then assert the in-band interrupt request by driving a first line of the data bus to a first signaling state during the period of time when the second master device is receptive to in-band interrupt requests. The first master device may release the first line of the data bus prior to expiration of the period of time when the second master device is receptive to in-band interrupt requests.

In some examples, the first master device may receive one or more clock pulses from a second line of the data bus during the period of time when the second master device is receptive to in-band interrupt requests. The first master device may receive clock pulses from the first line prior to the period of time when the second master device is receptive to in-band interrupt requests. The period of time when the second master device is receptive to in-band interrupt requests may occur during transmission of a heartbeat word.

According to certain aspects, the first master device may transmit a device identifier of the first master device in response to a command received after asserting the in-band interrupt request. The command may be related to an IRQ scan or IRQ group scan as disclosed herein.

According to certain aspects, the first master device may mask signaling transitions on the first line from a clock recovery circuit during the period of time when the second master device is receptive to in-band interrupt requests. In an I2C, CCI, CCIe or I3C bus, for example, the first wire may be the SDA and the second wire may be the SCL. In some configurations, the first wire may be the SCL and the second wire may be the SDA.

According to certain aspects, the second master device may voluntarily hand over control of the bus to the first master device. For example, the second master device may perform one or more communication tasks while initially in control of the data bus and may voluntarily yield control of the data bus when it has completed the communication tasks. The communication tasks may involve servicing (by read or write) one or more slave devices. The second master device may indicate its intent to give up the bus by transmitting one or more commands to the first master device, or to another master device. Indications of intent to voluntarily yield control of the data bus may be transmitted when the first master device acquires control of the data bus, when it has completed its communication tasks, or when it is nearing completion of its communications tasks. In some instances, the second master device may indicate that it has yielded control of the data bus by transmitting a command to the first master device. When the second master device has indicated its intent to give up the bus, the first master device may refrain from, or defer asserting an interrupt request to obtain control of the data bus.

Figure 28:
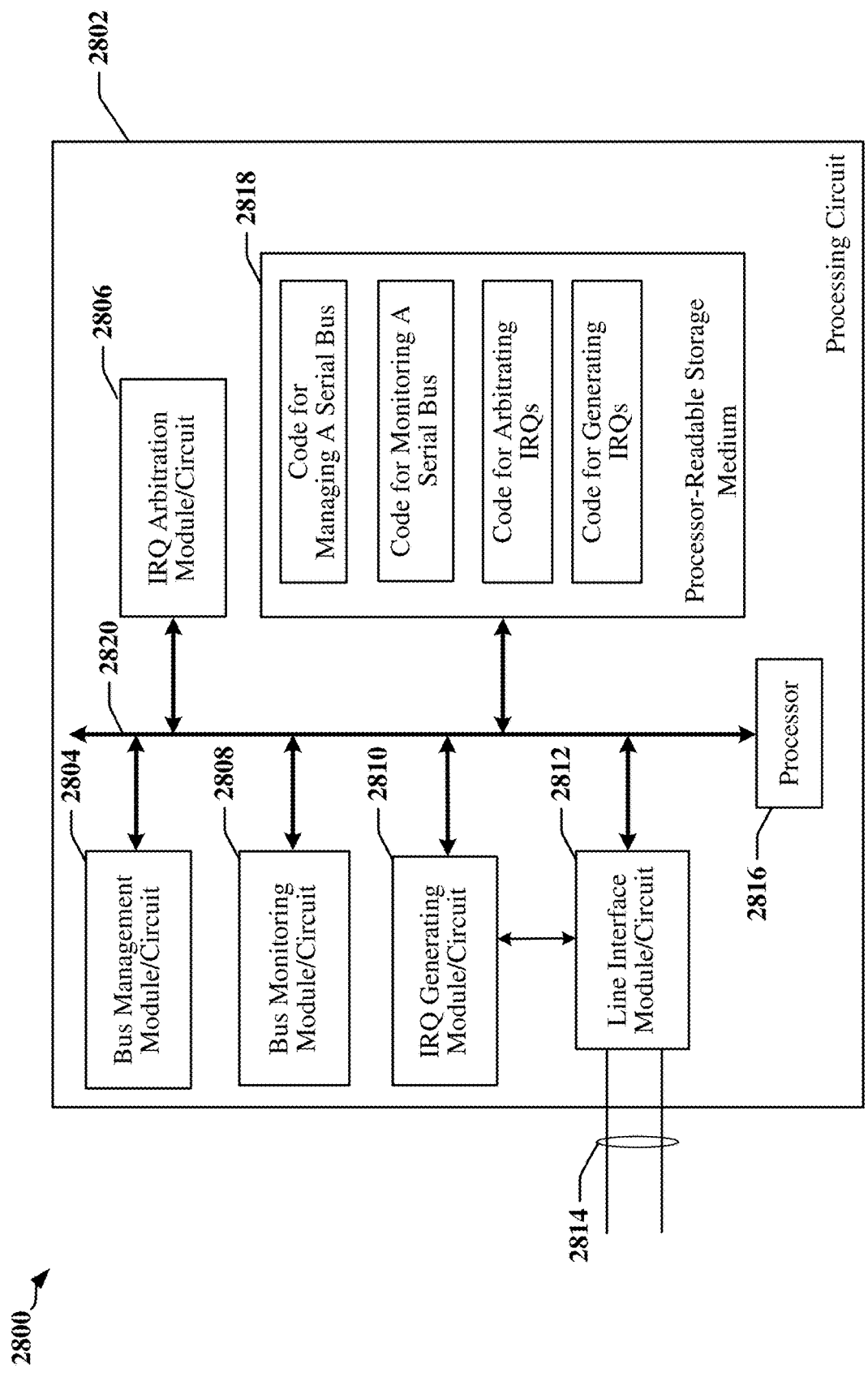
FIG. 28 is a diagram illustrating a second example of a hardware implementation for an apparatus employing a processing circuit adapted according to certain aspects disclosed herein.

FIG. 28 is a diagram illustrating an example of a hardware implementation for an apparatus 2800 employing a processing circuit 2802. The processing circuit typically has a processor 2816 that may include one or more of a microprocessor, microcontroller, digital signal processor, a sequencer and a state machine. The processing circuit 2802 may be implemented with a bus architecture, represented generally by the bus 2820. The bus 2820 may include any number of interconnecting buses and bridges depending on the specific application of the processing circuit 2802 and the overall design constraints. The bus 2820 links together various circuits including one or more processors and/or hardware modules, represented by the processor 2816, various modules or circuits 2804, 2806, 2808, 2810, line interface circuits 2812 configurable to communicate over connectors or wires of a serial data bus 2814 and the computer-readable storage medium 2818. The bus 2820 may also link various other circuits such as timing sources, peripherals, voltage regulators, and power management circuits, which are well known in the art, and therefore, will not be described any further.

The processor 2816 is responsible for general processing, including the execution of software stored on the computer-readable storage medium 2818. The software, when executed by the processor 2816, causes the processing circuit 2802 to perform the various functions described supra for any particular apparatus. The computer-readable storage medium 2818 may also be used for storing data that is manipulated by the processor 2816 when executing software, including data decoded from symbols transmitted over the connectors of the serial data bus 2814. The processing circuit 2802 further includes at least one of the modules 2804, 2806, 2808, 2810. The modules 2804, 2806, 2808, 2810 may be software modules running in the processor 2816, resident/stored in the computer-readable storage medium 2818, one or more hardware modules coupled to the processor 2816, or some combination thereof. The modules 2804, 2806, 2808, and/or 2810 may include microcontroller instructions, state machine configuration parameters, or some combination thereof.

In one configuration, the apparatus 2800 for wireless communication includes modules and/or circuits 2804 configured to manage communications over the serial data bus 2814 for all devices coupled to the serial data bus 2814, modules and/or circuits 2808 configured to monitor the serial data bus 2814 to ascertain when an IRQ has been asserted over the serial data bus 2814, modules and/or circuits 2806 configured to determine whether a different master device asserted the IRQ on the serial data bus 2814, where the apparatus 2800 is configured to hand over control of the serial data bus to the different master device that asserted the IRQ.

In one example, a first master device is initially in control of the serial data bus 2814, and a second master device is configured to assert an IRQ through the serial data bus while the serial data bus is controlled by the first master device, determine whether the first master device has released control of the serial data bus after assertion of the IRQ, and acquire control of the serial data bus.

According to certain aspects the apparatus 2800 may include a serial data bus having a first wire and a second wire, and a pull-up or pull-down resistor coupled to the first wire. The apparatus 2800 may include a plurality of devices coupled to the serial data bus, including a first master device and a second master device. The first master device may be configured to manage communications over the serial data bus for all devices coupled to the serial data bus, drive the first wire to a first signaling state, release control of the first wire. The first wire may be initially held in the first signaling state by the pull-up or pull-down resistor. The first master device may be configured to determine when an in-band interrupt request has been on the serial data bus based on the first wire being driven to a second signaling state. The second master device may be configured to determine or recognize commencement of a period of time when the first master device is receptive to interrupts, assert the in-band interrupt request by driving the first wire of the serial data bus to the second signaling state during the period of time when the first master device is receptive to interrupts, and release the first wire of the serial data bus prior to expiration of the period of time when the first master device is receptive to interrupts.

According to certain aspects, the first master device may be configured to provide one or more clock pulses on the second wire of the serial data bus after releasing control of the first wire. The first master device may be configured to provide clock pulses on the first wire prior to releasing control of the first wire. The second master device may be configured to mask signaling transitions on the first wire from a clock recovery circuit during the period of time when the first master device is receptive to in-band interrupt requests.

In some examples, first master device may be configured to release control of the first wire during transmission of a heartbeat word. The first master device may be configured to release control of the first wire when the serial data bus is idle.

According to certain aspects, one or more slave devices are coupled to the serial data bus and the first master device may be configured to transmit one or more commands addressed to the one or more slave devices and the second master device after determining that the in-band interrupt request has been asserted. The commands may be sent in an IRQ scan or IRQ group scan procedure. The first master device may be configured to receive an indication of the source of in-band interrupt request in response to the one or more commands.

According to certain aspects, the second master device may be configured to acquire control of the serial data bus from the first master device. The second master device may acquire control of the serial data bus when the first master device yields the serial data bus after processing an in-band interrupt request asserted by the second master device. In some implementations, the second master device may be configured to transmit information indicating an intent to voluntarily yield control of the data bus in a command sent to the first master device after acquiring control of the data bus. The information indicating an intent to voluntarily yield control of the data bus may be sent to multiple master devices and may be operative to prevent assertion of in-band interrupt requests for at least a period of time. For example, the first master device may be configured to defer assertion or otherwise refrain from asserting an in-band interrupt request on the serial data bus after receiving the command sent by the second master device.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a first master device, comprising:
    managing communications over a data bus for a plurality of devices coupled to the data bus, wherein two or more master devices are coupled to the data bus;
    determining when an in-band interrupt request has been asserted on the data bus;
    determining whether the in-band interrupt request on the data bus was asserted by a second master device; and
    handing over control of the data bus to the second master device after determining that the second master device asserted the in-band interrupt request.

2. The method of claim 1, further comprising:
    driving a first wire of the data bus to a first signaling state;
    releasing control of the first wire, wherein the first wire is initially held in the first signaling state by a pull-up resistor or a pull-down resistor; and
    determining that the in-band interrupt request on the data bus was asserted when the first wire is driven to a second signaling state.

3. The method of claim 2, further comprising:
    providing one or more clock pulses on a second wire of the data bus after releasing control of the first wire.

4. The method of claim 2, further comprising:
    providing clock pulses on the first wire prior to releasing control of the first wire.

5. The method of claim 2, further comprising:
    transmitting a heartbeat word on the data bus,
    wherein the heartbeat word provides clock information, and
    wherein control of the first wire is released during transmission of the heartbeat word.

6. The method of claim 2, wherein control of the first wire is released when the data bus is idle or when the data bus is an inactive mode of operation.

7. The method of claim 1, further comprising:
after determining that the in-band interrupt request has been asserted:
transmitting one or more commands to cause one or more devices that asserted the in-band interrupt request to provide their corresponding device identifiers; and
identifying a highest priority device requesting interrupt service based on the device identifiers.

8. The method of claim 1, wherein handing over control of the data bus to the second master device comprises:
transmitting a command to the second master device.

9. The method of claim 1, wherein the data bus comprises a two-wire serial bus.

10. A method operational on a first master device coupled to a data bus, comprising:
asserting an in-band interrupt request through the data bus while the data bus is controlled by a second master device;
determining whether the second master device has released control of the data bus after assertion of the in-band interrupt request; and
acquiring control of the data bus when the second master device has released control of the data bus.

11. The method of claim 10, wherein asserting the in-band interrupt request comprises:
driving a first line of the data bus to a first logic level for a first period of time,
wherein the first period of time occurs between data transmissions on the data bus.

12. The method of claim 10, further comprising:
determining that a period of time when the second master device is receptive to in-band interrupt requests has commenced;
asserting the in-band interrupt request by driving a first line of the data bus to a first signaling state during the period of time when the second master device is receptive to in-band interrupt requests; and
releasing the first line of the data bus prior to expiration of the period of time when the second master device is receptive to in-band interrupt requests.

13. The method of claim 12, further comprising:
receiving one or more clock pulses from a second line of the data bus during the period of time when the second master device is receptive to in-band interrupt requests.

14. The method of claim 12, further comprising:
receiving clock pulses from the first line prior to the period of time when the second master device is receptive to in-band interrupt requests.

15. The method of claim 12, wherein the period of time when the second master device is receptive to in-band interrupt requests occurs during transmission of a heartbeat word.

16. The method of claim 12, wherein control of the first line is released when the data bus is idle.

17. The method of claim 12, further comprising:
transmitting a device identifier to the second master device in response to a command received after asserting the in-band interrupt request.

18. The method of claim 12, further comprising:
masking signaling transitions on the first line from a clock recovery circuit during the period of time when the second master device is receptive to in-band interrupt requests.

19. The method of claim 10, further comprising:
transmitting information indicating an intent to voluntarily yield control of the data bus in a command sent to the second master device after acquiring control of the data bus.

20. An apparatus comprising:
a serial data bus having a first wire and a second wire, the first wire being coupled to a pull-up or pull-down resistor; and
a plurality of devices coupled to the serial data bus, including a first master device and a second master device,
wherein the first master device is configured to:
manage communications over the serial data bus for the plurality of devices coupled to the serial data bus;
drive the first wire to a first signaling state;
release control of the first wire, wherein the first wire is initially held in the first signaling state by the pull-up or pull-down resistor; and
determine that an in-band interrupt request on the serial data bus was asserted when the first wire is driven to a second signaling state, and
wherein the second master device is configured to:
determine that a period of time when the first master device is receptive to interrupts has commenced;
assert the in-band interrupt request by driving the first wire of the serial data bus to the second signaling state during the period of time when the first master device is receptive to interrupts; and
release the first wire of the serial data bus prior to expiration of the period of time when the first master device is receptive to interrupts.

21. The apparatus of claim 20, wherein the first master device is configured to:
provide one or more clock pulses on the second wire of the serial data bus after releasing control of the first wire.

22. The apparatus of claim 20, wherein the first master device is configured to:
provide clock pulses on the first wire prior to releasing control of the first wire.

23. The apparatus of claim 20, wherein the second master device is configured to:
mask signaling transitions on the first wire from a clock recovery circuit during the period of time when the first master device is receptive to interrupts.

24. The apparatus of claim 20, wherein control of the first wire is released during transmission of a heartbeat word.

25. The apparatus of claim 20, wherein control of the first wire is released when the serial data bus is idle.

26. The apparatus of claim 20, further comprising:
one or more slave devices coupled to the serial data bus,
wherein the first master device is configured to:
transmit one or more commands addressed to the one or more slave devices and the second master device after determining that the in-band interrupt request has been asserted; and
receive an indication of the in-band interrupt request in response to the one or more commands.

27. The apparatus of claim 20, wherein:
the second master device is configured to:
acquire control of the serial data bus from the first master device; and
transmit information indicating an intent to voluntarily yield control of the data bus in a command sent to the first master device after acquiring control of the data bus; and the first master device is configured to:
  refrain from asserting in-band interrupt requests on the serial data bus after receiving the command sent by the second master device.

28. An apparatus comprising:
means for managing communications over a multi-wire bus for a plurality of devices coupled to the multi-wire bus, wherein two or more master devices are coupled to the multi-wire bus;
means for providing interrupt opportunities for the plurality of devices;
means for determining when an in-band interrupt request has been asserted during an interrupt opportunity; and
means for identifying a source of in-band interrupt requests asserted on the multi-wire bus.

29. The apparatus of claim 28, wherein the means for providing interrupt opportunities is configured to:
drive a first wire of the multi-wire bus to a first signaling state;
release control of the first wire, wherein the first wire is initially held in the first signaling state by a pull-up resistor or a pull-down resistor; and
determine that the in-band interrupt request on the multi-wire bus was asserted when the first wire is driven to a second signaling state.

30. The apparatus of claim 28, wherein:
clock pulses are provided on a first wire of the multi-wire bus before control of the first wire is released; and
one or more clock pulses are provided on a second wire of the multi-wire bus after control of the first wire is released.

* * * * *